US008600536B2

(12) United States Patent
Sundling, Jr. et al.

(10) Patent No.: US 8,600,536 B2
(45) Date of Patent: Dec. 3, 2013

(54) METHOD AND SYSTEM FOR VIRTUALIZED COMPOSITE PROJECT WORK SCHEDULES

(71) Applicant: Pipeline Software, Inc., Santa Ana, CA (US)

(72) Inventors: David Alan Sundling, Jr., Henderson, NV (US); Raju Magan Patel, Tustin, CA (US)

(73) Assignee: Pipeline Software, Inc., Santa Ana, CA (US)

( * ) Notice: Subject to any disclaimer, the term of this patent is extended or adjusted under 35 U.S.C. 154(b) by 0 days.

(21) Appl. No.: 13/865,905

(22) Filed: Apr. 18, 2013

(65) Prior Publication Data

US 2013/0297060 A1     Nov. 7, 2013

Related U.S. Application Data

(60) Provisional application No. 61/636,569, filed on Apr. 20, 2012.

(51) Int. Cl.
*G06F 19/00*     (2011.01)
*G06Q 10/00*     (2012.01)

(52) U.S. Cl.
USPC .......... 700/100; 700/99; 705/7.12; 705/7.13; 705/7.16; 705/7.22

(58) Field of Classification Search
USPC ......... 700/99–100; 705/7.12–7.13, 7.16, 7.22
See application file for complete search history.

(56) References Cited

U.S. PATENT DOCUMENTS

| | | | | |
|---|---|---|---|---|
| 4,827,423 | A * | 5/1989 | Beasley et al. | 700/96 |
| 5,237,508 | A * | 8/1993 | Furukawa et al. | 700/100 |
| 6,546,300 | B1 * | 4/2003 | Fukuda et al. | 700/100 |
| 6,985,872 | B2 * | 1/2006 | Benbassat et al. | 705/7.14 |
| 7,024,681 | B1 * | 4/2006 | Fransman et al. | 725/115 |
| 7,873,430 | B1 * | 1/2011 | Sprecher | 700/100 |
| 8,504,396 | B2 * | 8/2013 | Quintus et al. | 705/7.11 |
| 2002/0001475 | A1 * | 1/2002 | Kikuchi et al. | 399/8 |
| 2002/0108077 | A1 * | 8/2002 | Havekost et al. | 714/47 |
| 2004/0122722 | A1 * | 6/2004 | Quintus et al. | 705/8 |
| 2006/0031110 | A1 * | 2/2006 | Benbassat et al. | 705/9 |
| 2006/0179469 | A1 * | 8/2006 | Fransman et al. | 725/115 |
| 2010/0251247 | A1 * | 9/2010 | Pedersen | 718/102 |

FOREIGN PATENT DOCUMENTS

| | | |
|---|---|---|
| JP | 2007 149070 A | 6/2007 |
| WO | WO 2004 102431 | 11/2004 |

OTHER PUBLICATIONS

"Shutdowns, Turnarounds, and Outages, Creating a New Standard for STO", Hard Dollar Corporation Brochure, Scottsdale, AZ, available online on or before Apr. 10, 2012.

"STO 2012 Shutdowns, Turnarounds, Outages Best Management Practices", The Eventful Group Conference Brochure, Syracuse, NY, available online on or before Apr. 10, 2012.

(Continued)

*Primary Examiner* — Ramesh Patel
(74) *Attorney, Agent, or Firm* — Knobbe, Martens, Olson & Bear, LLP

(57) ABSTRACT

Some embodiments provide a system for electronically generating a virtualized work schedule based on a composite of data gathered from multiple work planning, scheduling and other management information systems utilized in structured maintenance projects for a large-scale assets during a scheduled maintenance period. The system can include a schedule management system configured to facilitate communications among workers and managers during the scheduled maintenance period and expedite completion of the structured maintenance project.

30 Claims, 13 Drawing Sheets

(56) References Cited

OTHER PUBLICATIONS

"Immpower Enterprise Asset Management (EAM) and Computerized Maintenance Management System (CMMS) Software", Revere, Inc. Brochure, accessed for printing Jul. 18, 2013, Copyright 2010.

"Maxavera iPack SAP® PS+Microsoft® Project Integrated Project Controls Solution", Pipeline Software Inc. Brochure, Santa Ana, CA, Copyright 2011.

International Search Report and Written Opinion dated Jul. 24, 2013 for International Application No. PCT/US2013/037255.

* cited by examiner

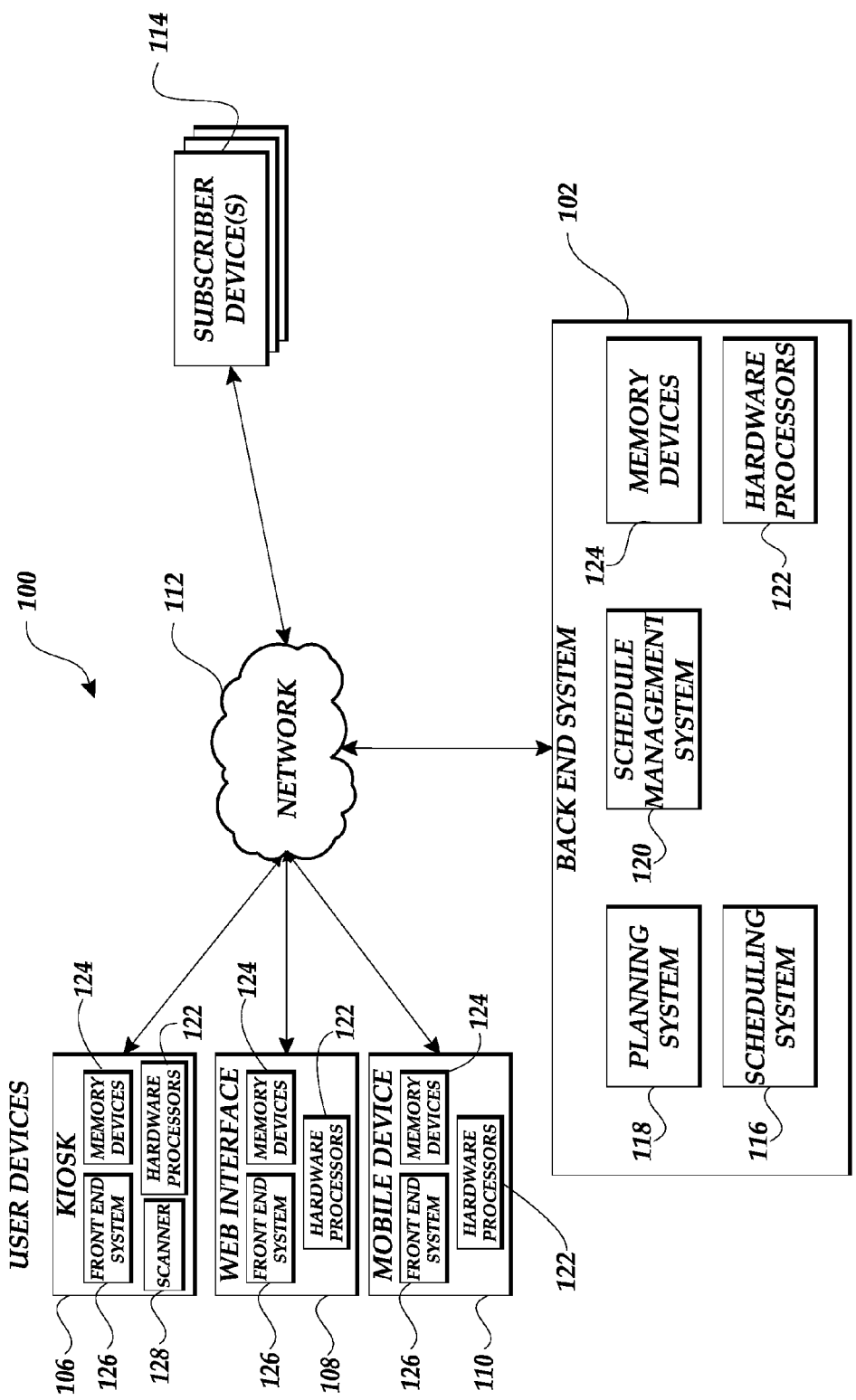

| | |
|---|---|
| Save | Cancel |

User Profile

YOU CAN UPDATE THIS USER'S INFORMATION USING THE FORM BELOW

USER DETAILS

| | |
|---|---|
| USERNAME | Anilg |
| PASSWORD | •••••••••••••••••••••••••••• |
| CONFIRM PASSWORD | •••••••••••••••••••••••••••• |
| PASSWORD HINT | p |
| FIRST NAME | Anil |
| LAST NAME | Gothal |
| DATE FORMAT | MM/dd/yyyy HH:mm ▼ |
| TIMEZONE | America/Los_Angeles ▼ |
| EMPLOYEE# | |
| BADGE# | 999999999 |

CONTACT

| | |
|---|---|
| E-MAIL | anil@pipelinesoftware.com |
| PHONE NUMBERS | |
| TEXT (SMS) | |
| PAGER | SNA4 |

ADDRESS

| | |
|---|---|
| ADDRESS | |
| CITY | Santa Ana |
| STATE | CA |
| ZIP | 92705 |
| COUNTRY | United States ▼ |

Account Settings
- ☑ Enabled
- ☐ Expired
- ☐ Locked
- ☐ Password Expired

FIG. 9

METHOD AND SYSTEM FOR VIRTUALIZED COMPOSITE PROJECT WORK SCHEDULES

BACKGROUND

1. Field

This disclosure relates generally to maintenance project work management systems and processes for large-scale plants and assets.

2. Description of Related Art

Asset-intensive industries are those types of businesses that rely on large infrastructure assets, typically plants of some sort or large network, to generate a large portion of their revenues. Examples of asset-intensive industries include oil & gas, power generation, mining, chemicals and to some extent telecommunications. The term "asset" or in these industries and for purposes of this document refers to the plant, network or facility itself, for example, a nuclear power plant, a hydro-electric dam, an oil refinery or an offshore platform.

These assets are large, complex, and inherently dangerous. Such assets require continuous maintenance to keep them in working order. Maintenance activities can include procedures that are intended to maintain or increase the intended performance, quality, safety, and/or service of the asset.

The asset is occasionally taken offline or out of service so that major maintenance work and/or capital modifications work may be performed. This offline maintenance period is frequently referred to as a shutdown, turnaround or outage, or an "STO". Costs for an STO can be range from $5 million to $250+ million over a period of several weeks or months depending on how much work will be performed during the STO. Large capital modifications to the plant can increase these costs substantially.

SUMMARY

In some embodiments, a schedule management system (SMS) can generate a secondary (e.g., virtual) schedule based on Outage Schedule data pulled from all involved management systems. The secondary schedule can also be referred to as a virtual schedule (VS). The terms secondary schedule, composite schedule, virtual schedule, and virtualized work schedule are used interchangeably throughout the disclosure.

The VS can provide a single, composite, updatable view of the Outage Schedule, regardless of how many source systems contributed data. As updates, such as work progress and status notes, are made to the VS it can immediately reflect these updates so that all users can see the most current state of the work, in some embodiments instantly. The VS can then intelligently determine which source systems need to be notified of the updates and create transactions in a queue for each impacted source system. The source systems are updated from the queue per the specific policies and update logic that govern each source systems. Sometimes the source system updates are automated and sometimes based on a human review and approval of the transactions to be applied.

The VS generated by schedule management system provides a second instance of the work schedule that is "owned" by the field and line workers. They are able to frequently and freely update work progress and notes with little or no restrictions, which can be reflected immediately in the virtual schedule, providing a near real-time view of work progress and status that can be used for decision making, without impacting the main corporate management systems. Because updates can be made directly to the VS, the field and line workers need not understand or use any of the complex, restrictive, management systems typically used in an STO.

In some embodiments the SMS can be used to access information from any or all of an organization's source systems including work planning systems, scheduling system, permit/clearance systems, materials management systems; prior to the scheduled maintenance period or during the scheduled maintenance period. The SMS then can generate an integrated virtual schedule based on the network(s) of work activities and other related data found in these systems, any predecessor and successor logic, and any other data relationships.

In some embodiments, the SMS can provide a user interface element identifies when all of the predecessor work activities to a given successor work activity in the VS have been completed, and represent this aggregated predecessor(s) status as a single icon next to the successor work activity to support rapid visual identification that all successor work has been completed and the successor work activity may now be started. The SMS, using the same calculation of aggregated processor(s) complete, can provide a notification to the end-user subscriber network which then sends an electronic notice to any subscribers of the successor work activity notifying them that all predecessor work has been completed.

In some embodiments, the SMS can provide a simplified web interface that displays the work activities of the virtual schedule and allows users to post progress, notes and other updates against each work activity. As updates are made to the work activities in the virtual schedule, the SMS determines which source system(s) need to be notified of such updates and creates transactions in update queues for each source system as required. The queued updates can be approved by an administrator for each of the targeted source systems before the updated information is allowed to revise data in the targeted source system.

The SMS can be configured to perform a virtual schedule refresh. An updated version of the virtual schedule is generated by collecting information from the source systems, whereby data from such systems overwrites all information in the virtual schedule with the exception of progress updates and other transactional data collected by the virtual schedule.

Some embodiments provide a system for electronically managing a structured maintenance project for a large-scale asset during a scheduled maintenance period. The system can include a schedule management system configured to facilitate communications among workers and managers during the scheduled maintenance period and expedite completion of the structured maintenance project.

The SMS can include instructions stored on one or more memory devices. The instructions, when executed by one or more hardware processors, can cause the SMS to access planning information from at least one planning system; access a master schedule from a scheduling system that is configured to aggregate planning information from the at least one planning system, wherein the master schedule is created by the scheduling system using data including the planning information and contains scheduling information for structured tasks, wherein the structured tasks have one or more predecessor dependencies, one or more successor tasks, or a combination of predecessor dependencies and successor tasks; create a secondary schedule from an instance of the master schedule before the scheduled maintenance period begins or during the scheduled maintenance period; during the scheduled maintenance period, receive a task update for a task in the secondary schedule, wherein the task update provides updated information including at least one of updated planning information or updated scheduling information for the task; revise the secondary schedule to include at least a portion of the updated information when the task update is received; provide updated planning information to the planning system when the task update includes updated planning information; provide updated scheduling information to the scheduling system when the task update includes updated scheduling information; associate the task with a subscriber network including personnel attached to one or more predecessor dependencies or successor work activities of the updated work activity, wherein the end-user subscriber network is configured to electronically transmit at least a portion of the updated information from the SMS to electronic devices used by the personnel; and transmit at least a portion of the updated information via the subscriber network when the task update is received.

In certain embodiments, the scheduled maintenance period includes a period during which the large-scale asset is offline. The structured maintenance project can be performed during a scheduled outage of the large-scale asset.

The SMS can be configured to send planning information to a planning update queue in which updated planning information is approved by an administrator before the updated planning information is permitted to revise the planning system. In some embodiments, the SMS is configured to send updated scheduling information to a schedule update queue. In certain embodiments, an administrator approves updated scheduling information in the schedule update queue before the master calendar is updated to include the updated scheduling information.

The structured tasks can include tasks with finish-to-start dependencies and tasks with start-to-start dependencies. The structured tasks can include tasks that are performed in series and tasks that are performed in parallel.

The SMS can provide an administrator user interface, a supervisor user interface, and a worker user interface each with successively fewer permissions to access planning information and scheduling information than the administrator user interface. A kiosk positioned near or within a work site of the large-scale asset can provide an instance of the worker user interface. The kiosk can include an electronic sensor configured to read printed bar codes and QR codes. Administrator, supervisor or the worker user interfaces can include an Internet-based interface. The administrator, supervisor, or worker interfaces can be accessed remotely be a wireless device, such as a tablet computing device. In certain embodiments, the administrator user interface is accessible to only a restricted subset of personnel attached to the structured maintenance project.

The SMS can include a user interface that requires user authentication before the task update is accepted. The user interface can have multiple view configurations. One of the multiple view configurations that is suited for a particular user can be employed in the user interface after the user completes user authentication.

Each of the structured tasks can have a scheduled start time. The SMS can be configured to electronically notify at least one end-user subscriber network when the scheduled start time has elapsed and the work order has not commenced. A task update can include a start time, a completion time, a completion percentage of the task, time remaining for the task, deviation codes, comments, or a combination of the foregoing information.

The SMS can be configured to cease operation after the structured maintenance project is completed. In some embodiments, the large-scale asset is, for example, a nuclear power plant, a hydro-electric dam, or an oil refinery.

Certain embodiments provide a SMS configured to facilitate communications among workers and managers during a scheduled maintenance period and expedite completion of a maintenance project for a large-scale asset, wherein the maintenance project includes structured tasks. The system can include a scheduling system module configured to access a master schedule from a scheduling system. The master schedule can include at least one of planning information or scheduling information for each of the structured tasks. The structured tasks can have one or more predecessor dependencies, one or more successor tasks, or a combination of predecessor dependencies and successor tasks.

A secondary schedule creation module can be configured to create, before the scheduled maintenance period begins or during the scheduled maintenance period, a secondary schedule that is an instance of the master schedule. A secondary schedule update module can be configured to receive, during the scheduled maintenance period, a task update for a task in the secondary schedule. The task update can provide updated information including at least one of updated planning information or updated scheduling information for the task and revise the secondary schedule to include at least a portion of the updated information when the task update is received.

The system can include a subscriber network module configured to electronically transmit at least a portion of the updated information from the SMS to a subscriber network including electronic devices used by personnel attached to one or more predecessor dependencies or successor tasks of the task.

The scheduling system interface module can be configured to provide updated planning information to the planning system when the task update includes updated planning information. The SMS can be configured to cease operation after the structured maintenance project is completed.

The system can include a planning system interface module configured to access planning information from a planning system. The planning system interface module can be configured to provide updated planning information to the planning system when the task update includes updated planning information.

The system can be configured to perform a virtual schedule refresh. An updated version of the master schedule can replace the virtual schedule when the secondary schedule refresh is performed. The virtual schedule refresh can be performed periodically at regular intervals during the scheduled maintenance period. In some embodiments, the virtual schedule refresh is performed when the master schedule is updated or at user-controlled times.

The system can be configured to identify task updates that contain errors. The system can be configured to automatically determine whether the task update contains an error according to one or more defined rules, and such erroneous updates are not allowed to update the virtual schedule. In some embodiments, the virtual schedule is not revised to include updated information from the task update when it is determined that the task update contains an error.

The end-user subscriber network module can be configured to transmit a text message, an email, a pager notification, or a combination of electronic messages to the subscriber network.

Certain embodiments provide a method for managing a maintenance project for a large-scale asset during a scheduled maintenance period, wherein the maintenance project includes structured tasks. The method can include accessing planning information from at least one planning system; accessing a master schedule from a scheduling system that is configured to aggregate planning information from the at least one planning system, wherein the master schedule is created by the scheduling system using data including the planning information and contains scheduling information for structured tasks, wherein the structured tasks have one or more predecessor dependencies, one or more successor tasks, or a combination of predecessor dependencies and successor tasks; and creating a virtual schedule from an instance of the master schedule before the scheduled maintenance period begins or during the scheduled maintenance period. During the scheduled maintenance period, a task update for a task in the virtual schedule can be received. The task update can provide updated information including at least one of updated planning information or updated scheduling information for the task.

The method can include revising the secondary schedule to include at least a portion of the updated information when the task update is received; providing updated planning information to the planning system when the task update includes updated planning information; providing updated scheduling information to the scheduling system when the task update includes updated scheduling information; associating the task with a subscriber network including personnel attached to one or more predecessor dependencies or successor tasks of the task; and electronically transmitting at least a portion of the updated information to electronic devices used by the personnel within the subscriber network after the task update is received. In certain embodiments, the maintenance project is an upgrade to the large-scale asset.

In some embodiments, the method includes communicating updated information to the subscriber network for an elapsed task, wherein the elapsed task has a timing component that has been exceeded, and wherein the subscriber network is associated with a successor task to the elapsed task. The method can include ceasing use of the secondary schedule after the structured maintenance project is completed.

BRIEF DESCRIPTION OF THE DRAWINGS

Some embodiments are depicted in the accompanying drawings for illustrative purposes, and should in no way be interpreted as limiting the scope of the inventions described herein. In addition, various features of different disclosed embodiments can be combined to form additional embodiments, which are part of this disclosure. Any feature or structure can be removed or omitted. Throughout the drawings, reference numbers may be reused to indicate correspondence between reference elements.

FIG. 1 is a block diagram depicting an illustrative operating environment for a maintenance management system.

FIG. 9 is an illustrative user profile for a schedule management system.

DETAILED DESCRIPTION

Figure 2A:
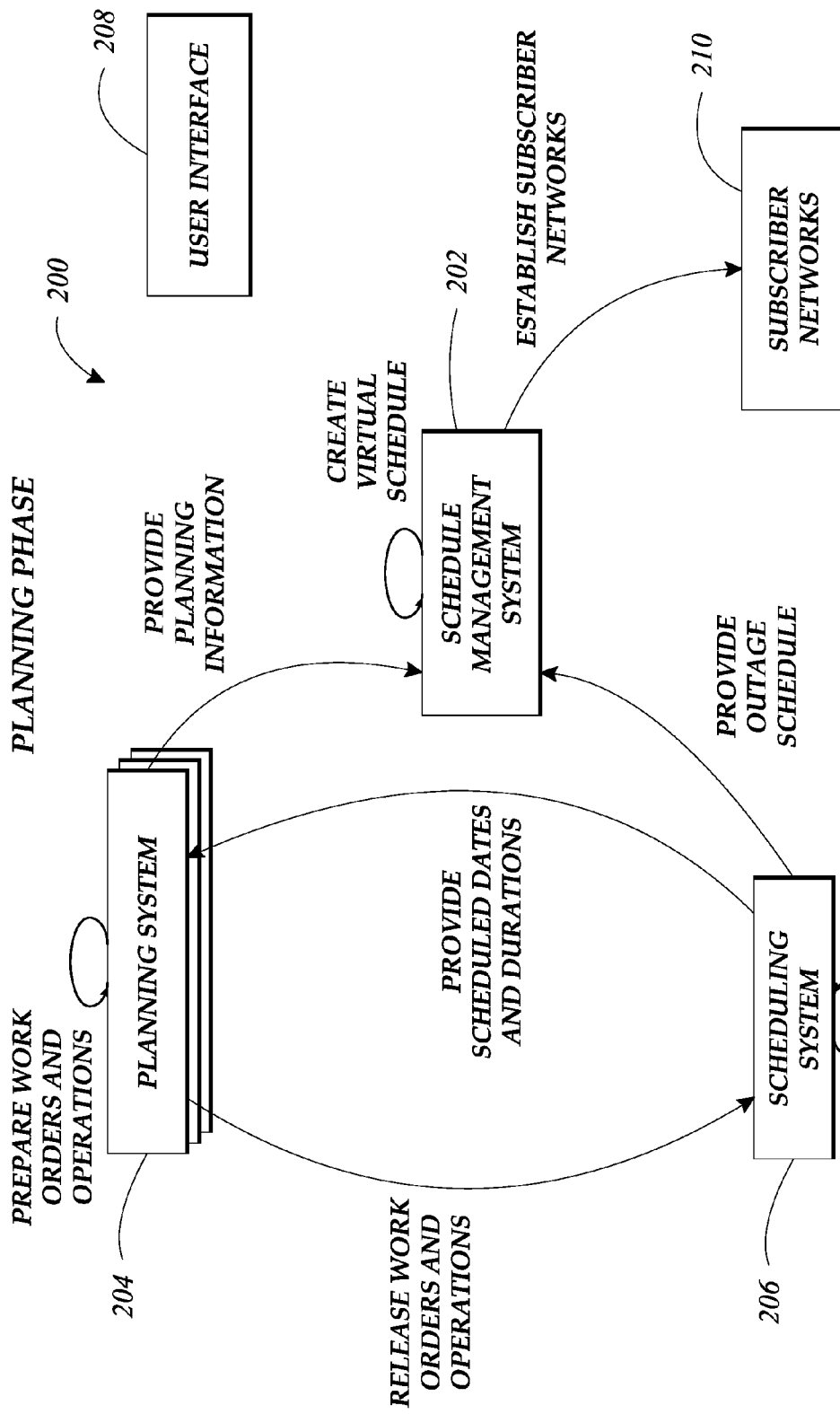
FIG. 2A is an illustrative operating environment representing interactions between a schedule management system, a scheduling system, a planning system, a user interface, and subscriber networks during a planning phase of a maintenance management period.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Asset-intensive industries are those types of businesses that rely on large infrastructure assets, typically plants of some sort or large network, to generate a large portion of their revenues. Examples of asset-intensive industries include oil & gas, power generation, mining, chemicals and to some extent telecommunications. The term "asset" or "strategic assets" in these industries refers to the plant, network or facility itself, for example, a nuclear power plant, a hydroelectric dam, an oil refinery or an offshore platform.

These assets are generally valued in the billions of US dollars. They are extremely complex, inherently dangerous, and operations are highly regulated. Reliability and performance of these assets is crucial to the financial performance of the business that owns them. For example, when a power plant is not generating electricity the utility that owns it can be losing more than $1 million per day in revenue, and is forced to buy replacement electricity from the grid, often from a competitor, to supply its customers. A large refinery is capable of producing 400,000+ barrels of product per day.

Companies invest a substantial amount of capital in systems and processes to keep these assets performing at their peak. Included in this mix of investments are various types of software applications, often referred to as EAM (enterprise asset management). The older term is CMMS (computerized maintenance management system). While pretty much every piece of software involved in managing an asset can be categorized as EAM, there are sub categories for specialized functions including radiation protection, worker fatigue, reliability metrics, permit management, and project management.

There are hundreds, and sometimes thousands of people involved in maintaining these large assets. A large oil refinery can span more than 1,000 acres and during peak periods have more than 3,000 people execute tens of thousands of discrete work orders over a 90 day period. There is a team of people with the primary job of just trying to maintain a work plan and schedule across this large maintenance effort.

Large-scale assets can receive scheduled maintenance during a period sometimes called a shutdown, turnaround or a planned outage. Any type of scheduled maintenance period will sometimes be referred to herein as an STO. In some embodiments, the entire plant or asset is taken offline during an STO for major maintenance and improvement work that is not performed when the asset is online. For example, the reactor at a nuclear power plant is refueled approximately every 18 months. This requires bringing the entire plant down, letting the systems cool, changing out the fuel, and bringing the plant back online. While the plant is down for refueling companies use this as a window to perform other maintenance work that could not otherwise be performed, as well as making any capital modifications (aka capital mods, CAPEX) to the facility to bring it into compliance or make performance improvements.

The cost of an STO can range anywhere from $20 million to $250+ million over a period of 4 to 18 weeks depending on how much work the plant is going to try to perform during the STO. Large capital modifications are often performed during the STO which can increase costs even more substantially.

The work performed during an STO may include tens of thousands of complex interrelated work activities that must be performed in sequence by hundreds or thousands of workers. The work must be performed quickly while meeting stringent safety and regulatory compliance standards. Intense collaboration, coordination and communication among management, operations and maintenance crews are critical to completing the work within the allotted outage window. The large volumes of complex interrelated work activities combined with the communication latencies across a distributed workforce of hundreds or thousands of people is exceptionally difficult even for professionals with this specialization, and often results in high levels of disorganization and schedule slips.

Organizations rely on various software applications to help them manage STO's. Most organizations utilize a collection of specialize software applications to manage their STO's including those for materials management, work planning, clearance & permit management, resource loading and scheduling. However, despite the maturity of these tools and popularity of their use organizations find they lack the capability of providing the real-time communication and visibility required to optimize these large maintenance projects.

The rigid and complex nature of currently available systems, combined with the reality that most organizations must utilize multiple applications from different vendors, creates substantial business process latencies that result in a disconnect between the status of the actual work being performed in the field and the status reflected in these management systems. If the management systems do not accurately reflect the work being performed in the field they can no longer be relied upon for decision making, impairing visibility for all stakeholders and forcing the management team to resort back to inefficient manual processes. These manual processes waste inordinate amounts of manpower while increasing the possibility of schedule slip-risk often valued in the millions of dollars per day.

At least some embodiments disclosed herein provide solutions to at least some scheduling problems associated with shutdowns, turnarounds, and planned outages. The large scale and vast resources involved during an outage complicates the issues and make it extremely difficult to coordinate all of the scheduled work activities between the vast number of people that need to operate cohesively in order for the outage to proceed in an orderly and cost efficient process. During an STO literally thousands of human and equipment resources need to coordinated and orchestrated to minimize plant downtime. The cost of downtime is often more than $1 million per day. To manage this effort companies put in place various specialist resources, systems and processes—and the entire process is managed according to an elaborate project plan & schedule ("Outage Schedule"), often with more than 20,000 interdependent tasks, also referred to as work activities, that will be delivered using thousands of staff and contractor resources.

The information for the Outage Schedule is contained and managed by one or more management systems that contain information such as work orders, work activities, materials, resources, safety, financial information, resources and work schedules. Examples of such systems include applications like SAP, IBM Maximo, Oracle EBS/EAM, Ventyx Asset Suite, TechAssist eSOMS, Primavera P6 and Microsoft Project. Because of the scale and complexity and regulatory requirements it typically requires the use of multiple disparate application systems to manage a large STO properly. Generally, work plans are developed in a planning system like SAP PM while work clearances and permits are managed in a specialized tool like Ventyx eSOMS, schedules are maintained in project management software tools such as Oracle Primavera or Microsoft Project, labor actuals are managed in other applications.

The scheduling system manages and keeps track of activities, schedule dates, resources, and progress of the effort. The scheduling system compiles all the information and interdependencies from the planning systems into the Outage Schedule. The Outage Schedule has tasks that are scheduled to be performed in series and tasks that are scheduled to be performed in parallel. Popular scheduling tools include Oracle Primavera P6, Microsoft Project, and various scheduling tools designed for specific industries.

In addition to the difficulty associated with the collection, input and analysis of work progress that goes into creating the Outage Schedule, after the outage has started, all groups across the plant must be kept in communication throughout the course of the scheduled outage. With thousands of interdependent work activities being performed in parallel, it presents quite a challenge to keep all of the organizations apprised to the current schedule. As work progresses, updates must be made to a multitude of separate systems. These updates are often duplicative in nature. For example when a work activity is performed an update is required in the planning system's work order operation record, an update to the schedule system's activity progress, and update to the clearance/permitting system that the work is complete and a final inspection is required. To complicate matters further, many organizations put strict limits on who can update these systems and when, in particular the scheduling system, for policy and regulatory reasons. The primary reason being, if updates were input into the Outage Schedule at the same frequency as the work was actually performed there would be no "schedule stability", meaning that if someone were to print out the schedule at any particular point in time they would get a different result from one minute to the next. Regulatory agencies and plant management don't allow for amorphous schedules. Therefore, changes/updates are queued up, typically as written comments on schedule print-outs, and updates are made in batch once or twice per day by a highly trained person who can interpret the impact of the updates to the schedule. After which, a new schedule is calculated and distributed to the workers.

The 12 and 24 hour schedule updates satisfy regulators and management, but are less useful to the thousands of workers performing the work. The updated schedule is out of date almost immediately after the updates are completed because the work never stops. By the time the updated schedule is printed and distributed to all of the organizations it is out of sync and does not reflect the status of the work in the field. Static schedules do not provide the requisite information to the workers during complex outages. As such outage coordinators and supervisors cannot rely on the Outage Schedule to know the true status of work activities related to their work orders, such as whether work is done, on time, late, delayed, and so on. This lack of visibility makes it difficult for organizations to effectively deploy their resources because they are not sure if any predecessor work is completed or delayed. This results is excessive manual communications, such as phone calls and meetings to update the status of tasks. During a typical outage thousands of man-hours are wasted because of scheduling inefficiencies and the inability to effectively dispatch crews. These activities typically result in schedule slips, which can cost millions of dollars per day.

This problem is further compounded by the system interfaces of the different scheduling and planning systems. The information that the outage coordinators and supervisors need in order to make decisions is typically spread across not just the scheduling system but also multiple planning systems. The supervisors are therefore required to log into multiple systems to find information relevant to the work being performed. As work is completed they are required to make updates in this plurality of systems, each of which has its own unique UI and navigation model. Even for users that have the knowledge and skill to update these systems this can be a difficult process. Additionally, many times the planning systems, like with the scheduling systems, do not allow work orders to be directly updated to the system. Rather, work order updates are written on paper and are queued to a management team to approve and update the system.

The schedule management system (SMS) in the present disclosure addresses difficulty associated with resource and schedule management associated with an outage. The SMS extracts and compiles data from all relevant source systems and generates a virtual instance of the STO schedule that can be updated freely by participants as work is performed. This freedom enables near real-time schedule that reflects the most recent progress of work without sacrificing scheduling stability. Updates made to the SMS can be reflected immediately in the VWS, but to the extent that such updates impact other source systems these updates are queued up by the SMS to be applied later. Further, because the SMS can be updated in real-time with work progress it can act as a communication interface between the organizations to apprise the workers of the completion of interdependent work activities so that resources can be effectively allocate and utilized in response to the real-time progress of the schedule. Next, the SMS communicates directly with each of the appropriate source systems and based on the update policies of each source system provides the updated work progress and other information stored in the SMS's update queue. The SMS also provides a manual approval option for cases when specific personnel are responsible for approving and managing source system updates.

The SMS is designed to maintain schedule stability while still providing real time updates to the workers and abiding by regulatory and process restrictions. The SMS caches or queues each transactions or update, similar to the manual process of writing notes on a printed schedule. The Outage Schedule is only updated when the appropriate personal with authorization apply the updates to the primary scheduling system. The updated Outage Schedule is subsequently published in a controlled process that is in line with the policies of the plant, while the field workers can continue to refer to the SMS for schedule status because it reflects the most recent work status. The official Outage Schedule can further be processed, printed and distributed according to existing policies and procedures.

By using the SMS the foremen, supervisors, workers and maintenance staff are freed from the complexities of management systems so they can be more effectively utilized during the outage. Moreover, the SMS eliminates manual and duplicative data entry work activities which are error-prone and time consuming. The near real-time visibility of work progress enables compression of the schedule and optimization of resources resulting in shorter more cost efficient outages. The potential is to save millions of dollars per outage. Other benefits include massive reduction searching for and updating data across multiple systems since SMS compiles relevant data from source systems the data in a single place for both viewing and updating.

Systems for Managing Scheduled Maintenance of an Asset

FIG. 1 depicts an example operating environment 100 in which an outage management system is configured. The depicted environments depict a back end system 102, one or more user devices, including kiosks 106, web interface devices 108, and mobile devices 110, and one or more subscriber devices 114. Each of the user devices has one or more physical memory devices 124 and one or more hardware processors 122 for performing various features. Each of the user devices has a front end system 126 that uses hardware and/or software to implement various features that are communicated to the front end system 126 from the back end system 102. The front end system 126 may be deployed using Java technology, and can be deployed on Windows, Linux, Solaris, AIX systems, or other operating systems. An application server may be responsible for serving the web pages and maintaining user sessions. The front end system 126 may be set to run on any standard application server, such as Tomcat, JBOSS, Oracle Weblogic, or IBM Websphere.

The front end system may be accessed on the user devices using a kiosk or standard internet browser software. The kiosk system 106 has a hardware and/or software based scanner that is capable of scanning information into the kiosk such as bar codes and QR codes.

The back-end system 102 can be implemented with one or more physical servers or computing machines. The back end system has one or more physical memory devices 124 and one or more hardware processors 122 for performing various features. The back end system can include additional hardware and/or software for performing various features. For example, the planning system 118, the scheduling system 116, and the schedule management system 120 can be implemented on one or more servers. Further the back end system 102 may include one or more servers for receiving and responding to network requests from the front end systems 104. The servers used in the back end system 102 can include web servers, application servers, database servers, combinations of the same, or the like. The subscriber devices 112 may each be any of a number of computing devices that are capable of communicating over a network including, but not limited to, a laptop, personal computer, tablet computer, personal digital assistant (PDA), mobile phone, and the like. The planning systems may include applications such as SAP, IBM Maximo, Oracle EBS/EAM, and Ventyx eSOMS. The scheduling systems include project management software tools such as Oracle Primavera or Microsoft Project Enterprise.

Those skilled in the art will appreciate that the planning system 118, scheduling system 116, and schedule management system 120 may all be local and configured on the same server or computing device. The planning system 118, scheduling system 116, and schedule management system 120 may also be configured on different servers and/or may be network-based systems. Those skilled in the art will appreciate that the network 112 may be any wired network, wireless network or combination thereof. In addition, the network 112 may be a personal area network, local area network, wide area network, cable network, satellite network, cellular telephone network, etc., or combination thereof. Any suitable combination of protocols and components for communicating via the Internet or any of the other aforementioned types of communication networks can be used.

FIG. 2A is an illustrative operating environment for an outage management system 200 representing interactions between the schedule management system 202, the planning system 204, the scheduling system 206, the user interface 208 and the subscriber networks 210 during the planning phase of a scheduled outage period. During the planning phase, the planning system 204 and scheduling system 206 establish and prepare the overall project plan and schedule ("Outage Schedule") for the scheduled maintenance period.

There are one or more planning system 204 that contain and manage the planning information, which includes work orders, materials, resources, safety, and financial controls. The planning systems may utilize applications such as SAP, IBM Maximo, Oracle EBS/EAM, and Ventyx eSOMS. Generally each planning system 204 has its own interface, protocols, and API that must be followed to interact with the specific application. During the planning phase the planning system 204 prepares planning information, which includes work orders and operations that will occur during the scheduled outage period. After the work has been appropriately processed by the planning systems 204, it is released to the scheduling system 206.

The schedule management system combines relevant information from multiple source systems into an integrated schedule in the scheduling system. A planning system interface module from the schedule management system 202, extracts work orders and operations from each of the planning systems 204 and transfers it to the scheduling system 206. In addition to transferring work orders and operations, additional supporting information, such as work authorization requests, are transferred from a clearance management system 204, such as eSOMS, to the scheduling system 206.

After data from the planning systems 204 has been loaded into the scheduling system 206, the scheduling system is used to create an Outage Schedule. An Outage Schedule can include upwards of 20,000 interdependent work activities or work orders. The Outage Schedule defines scheduled dates, durations, predecessor dependencies, successor activities, and assigned maintenance groups for work orders within the Outage Schedule. The Outage Schedule has work activities that are scheduled to be performed in series and work activities that scheduled to be performed in parallel.

After the Outage Schedule is complete, the planning system 204 is updated with the scheduled dates and durations from the scheduling system 206. The Outage Schedule is also provided to the schedule management system 202.

The schedule management system 202 creates a secondary (e.g., virtual)_schedule, also referred to as a virtual schedule, instance comprised of data from the scheduling system 206 and planning systems 204 and any other relevant systems. The virtual schedule is created as the plant moves into the outage work execution phase and contains the data from the Outage Schedule necessary to provide the user interface with real-time schedule information during the scheduled outage period. The schedule management system 202 may pull additional supporting data from the planning systems 204 for the virtual schedule. Any planning information that is pulled from the planning system 204 is defined by specific constraints and rules defined in the schedule management system 202. Even though a virtual schedule is created by the schedule management system 202, the Outage Schedule remains the official schedule for the scheduled outage period for purposes of management and regulatory compliance. However, the virtual schedule is the primary working tool for front-line supervisors, coordinators and worker execution teams to view and update schedule and project information during the scheduled outage period.

The schedule management system establishes one or more subscriber networks. The subscriber networks are established to optimize and facilitate communication regarding the status and completion of work orders during the scheduled outage period. The subscriber networks determine which personnel receive updates from the SMS when updates to the virtual schedule are made. Each subscriber networks has one or more subscribers. The subscriber networks may be established according to maintenance groups (i.e., plumbing, electrical, safety, etc.), procedures, work orders, or any other appropriate rules or procedures. Preferably the subscriber networks are established based upon information received from the scheduling and planning systems. Preferably, every work order has one or more subscriber networks assigned to the work order. When a work orders receives an update, each subscriber network, and each subscriber within each network, receives an update from the SMS relating to that work order.

Generally subscriber networks are associated with work orders where the subscribers need to know whether work has been performed and how it will impact a worker's work orders. For example, a foreman would be a subscriber to work orders that falls under his stewardship. In addition the foreman would subscribe to a number of predecessor work orders that are required to be completed before his own work activities can commence. A worker underneath the foreman may only subscribe to a smaller number of subscriber networks. Preferably, the subscribers associated with a work order would include the workers responsible for performing the work order, the supervisor responsible for the workers, workers and supervisors scheduled to perform other work orders dependent upon the work order, and planning personal responsible for overseeing the progress of the work order.

Figure 2B:
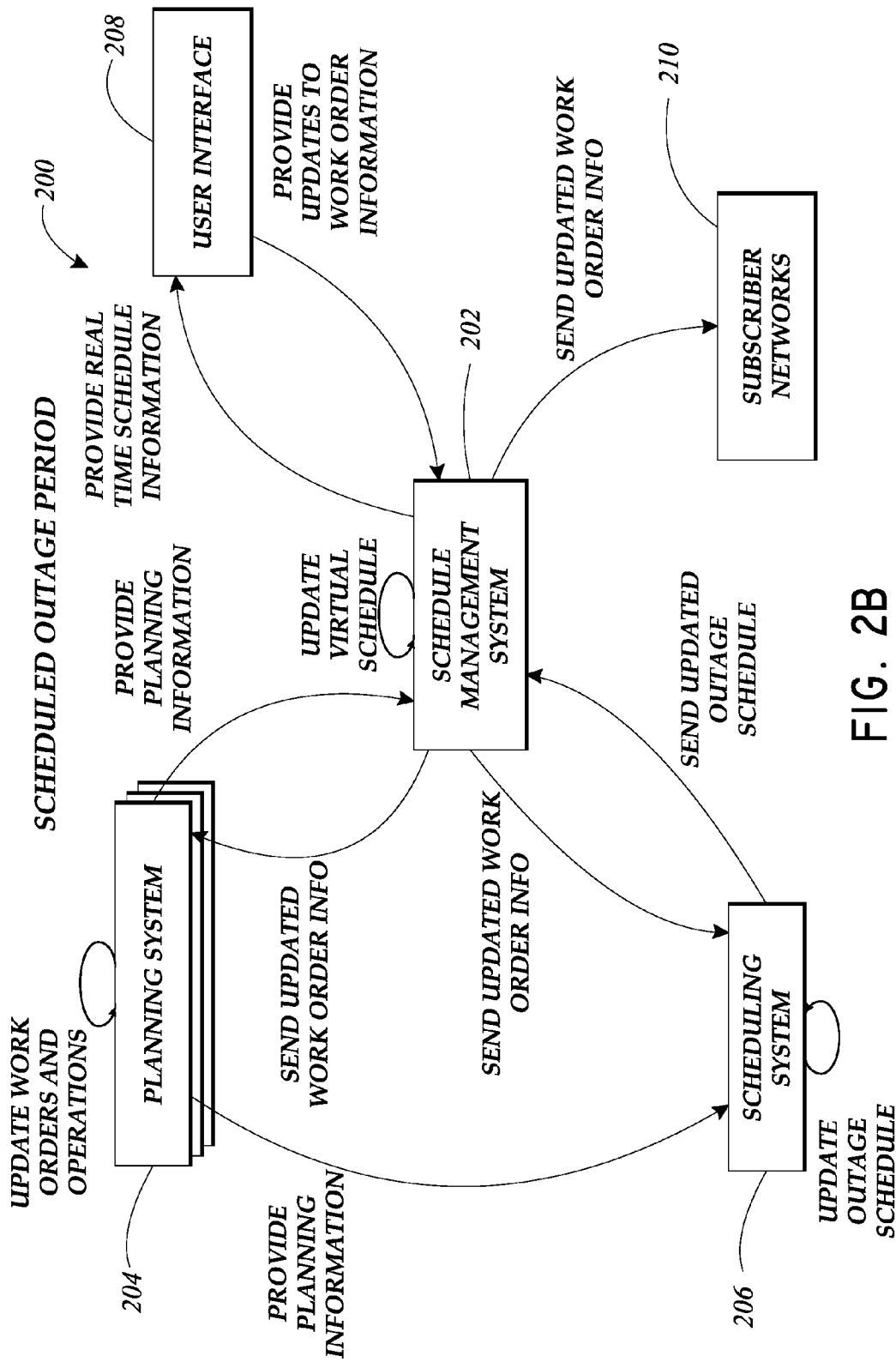
FIG. 2B is an illustrative operating environment representing interactions between a schedule management system, a scheduling system, a planning system, a user interface, and subscriber networks during a maintenance management period.

FIG. 2B is an illustrative operating environment for an outage management system 200 representing interactions between the schedule management system 202, the planning system 204, the scheduling system 206, the user interface 208 and the subscriber networks 210.

The virtual schedule created by the SMS 202 is the primary schedule used by the foremen, supervisors, workers and maintenance staff during the scheduled outage period. The virtual schedule provides real time updates on the status of work orders and operations occurring during the scheduled outage period. The SMS 202 presents the compiled virtual schedule to users in a unified view through a user interface 208. The user interface is the primary method for updating the schedule in real-time by supervisors and workers during a scheduled maintenance period.

The user interface is an intuitive web-based interface that allows users to efficiently view work order and activities information, and update work status. The user interface is accessible through kiosks located at the facility and through a web interface using a computing device, such as a laptop, computer, tablet, or web capable mobile device. This significantly reduces the effort required for supervisors and workers to capture up-to-the-minute work status information—enabling more informed decision making that results in better optimization of resources, scheduling and schedule adherence.

The SMS 202 provides real time schedule information to the user interface 208. The UI 208 provides the users to access to the virtual schedule. The supervisors and workers can request work order information relating to specific work requests. For example at a kiosk, a worker can scan a work order into the kiosk. The information for the work order will be pulled from the virtual schedule and the user can update the work order, such as work start time, provide a status update, or provide a completion time. After the user submits the update to the work order, the updated work order information is processed by the SMS 202 according to specific rules and parameters. Based on the information provided in the status update, the SMS 202 may provide updated work order information to one or more planning systems, the scheduling system, one or more subscriber networks, all of them or none of them.

For an update to the planning system, the SMS 202 determines whether the update to the work order information would require an update to one or more planning systems. If the SMS 202 determines that an update to one or more planning systems is required then the SMS 202 will queue an update the planning system via an interface module. The update to the planning system may go to a queue so that it can be approved and the updated within the planning system. Not all updates require approval from supervising personnel, depending on the rules and constraints of the SMS, the update may be applied directly to the planning system without approval. The interface module communicates with the planning system in to ensure that the updated work activity information is provided following the proper system protocols. The SMS 202 will perform the same functions to determine if the scheduling system needs to be updated and will process data to update queues as necessary. Preferably, work activity updates intended for the scheduling system are stored in the queue and not applied automatically so that it may be approved by administrative personnel. After the administrative personnel approve the updated work information, the interface applies the updates to the scheduling system and the Outage Schedule is updated.

For an update to the subscriber networks, the SMS 202 determines whether the update to the work activity information should trigger an update to one or more subscriber networks. If the SMS 202 determines that an update to one or more subscriber networks is required, the SMS 202 will determine which subscriber networks need updates based upon the subscriber networks that are associated with the work activity that received an update. The SMS 202 will send electronic communications to each subscriber within each of the associated subscriber networks with the updated work activity information. The electronic communication received by the subscribers may be via email, text message, pager, or other form of electronic communication. Preferably each subscriber specifies the type of electronic communication that should be sent to the subscriber. Preferably the updated information is automatically sent to each subscriber without the need for additional oversight or approval by administrative personnel.

For an update to the scheduling system, the SMS 202 determines whether the update to the work activity information would require an update to the scheduling system. If the SMS 202 determines that an update to scheduling system is required then the SMS 202 will send an update to the scheduling system via an interface module. The interface module communicates with the planning system to ensure that the updated work order information is provided following the proper protocols. Preferably the work order update is queued or cached so that it can be approved by the appropriate supervising personnel. Not all updates require approval from supervising personnel, depending on the rules and constraints of the SMS 202, the update may be applied directly to the outage schedule without approval.

Periodically, typically every 12 or 24 hours, the SMS system 202 will receive updated Outage Schedule information. The updated Outage Schedule may have updates received from the scheduling system and one or more of the planning systems in addition to the updates captured by the SMS 202. The schedule management system's interface module applies rules that govern the synchronization of the virtual schedule in the SMS 202 with data from the planning and scheduling systems so that queued updates in the secondary schedule are not lost as a result of synchronization.

Figure 3:
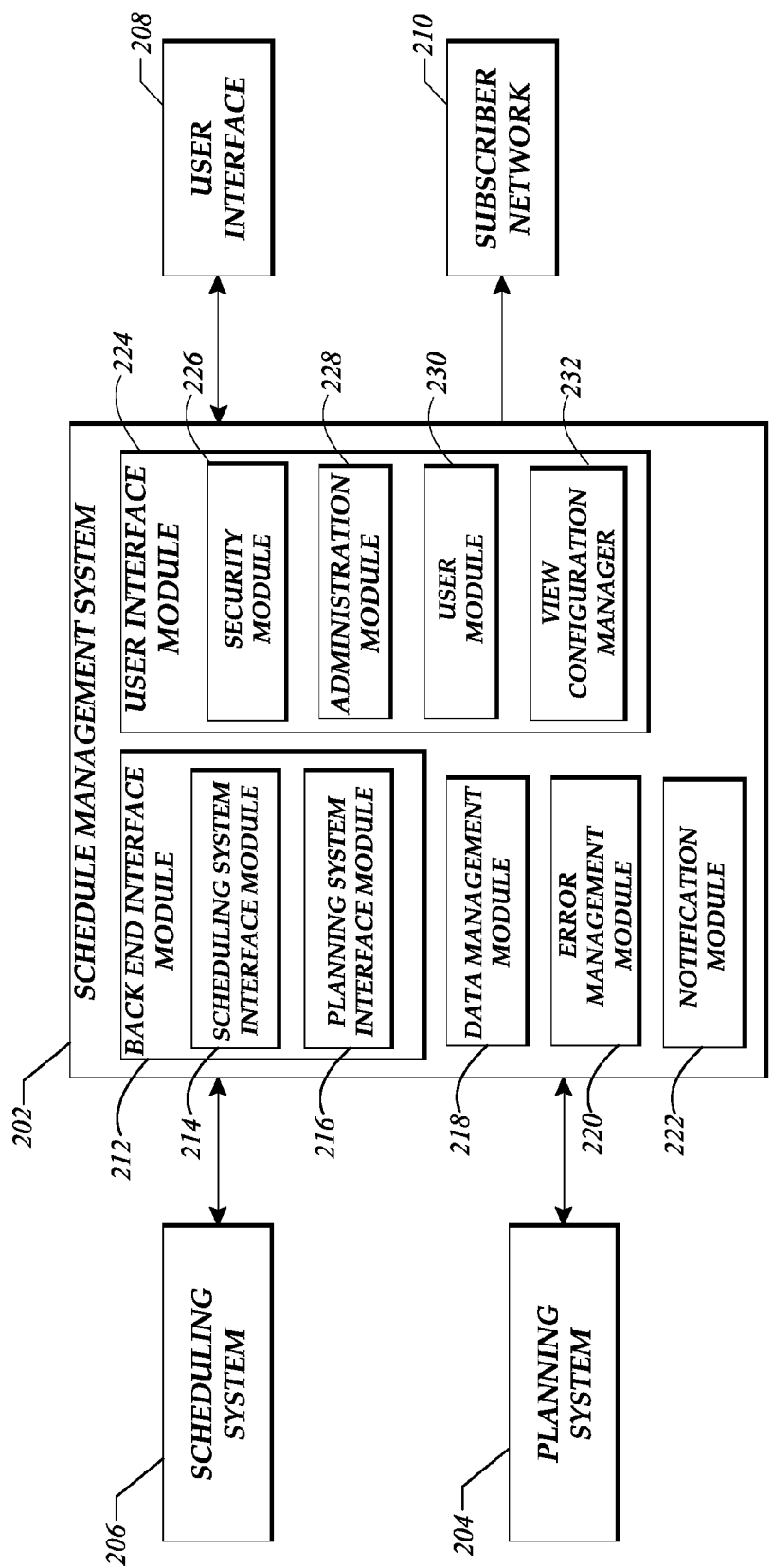
FIG. 3 is an illustrative operating environment representing interactions between a schedule management system, a scheduling system, a planning system, a user interface, and subscriber networks.

FIG. 3 is an illustrative operating environment of the schedule management system 202. The SMS is in communication with the scheduling system 206, one or more planning systems 204, one more user interfaces 208, and one or more subscriber networks 210. The SMS has a back end interface module 212, a data management module 218, an error management module 220, a notification module 222, and a user interface module 224. The back end interface module has one or more modules to communicate and interface with back end applications and processes, namely a scheduling system 206 and one or more planning systems 204. The user interface module 224 a plurality of modules directed toward the operation and control of the front end user interface application that includes a security module, 226, an administration module 228, a user module 230, and a view configuration manager 232.

Back End Interface Module

The back end interface module 212 provides the integration between the SMS and the back end enterprise systems including the scheduling system 206 and planning systems 204. The back end interface module 212 has a scheduling system interface module 214 and one or more planning system interface modules 216. Each module performs the same general function of communicating and interfacing with the specific scheduling and planning systems. Each scheduling and planning system has a specific API or interface tables (collectively API's) that are used to interface and communicate with the system. The data contained within each scheduling system can is extracted and updated using approved APIs specific to the specific systems. For example, each scheduling system, such as Microsoft Project or Oracle Primavera, uses a different API. Each scheduling interface module is designed to interface with a specific scheduling or planning system. This architecture allows the SMS 202 to communicate with any scheduling or planning system. Specifically this architecture allows the scheduling system interface modules and the planning system interface modules to be upgraded without hindering other components of the system. As such the SMS 202 is not statically confined to specific applications or versions of applications. The back end interface module may have a dedicated job console for scheduling, setup of selection criteria, and mapping options.

The back end interface is responsible for extracting data from the enterprise systems and loading the data into the SMS 202. The back end interface also is responsible for transporting data from the SMS 202 to the scheduling system 206 and the planning systems 204. The back end system may also facilitate communication between the scheduling systems 206 and the planning systems 204.

Data Management Module

The data management module 218 handles the interaction with a data store for persistence of management data. By maintaining its own data store, the SMS 202 minimizes the load on the scheduling system 206 and planning systems 204. In addition, the data management module 218 handles summarization and de-normalization of the data, yielding improved query performance and analysis capability. The data store supports Oracle 10 g and 11 g and SQL Server 2005 and 2008.

Error Management Module

The error management module 218 tracks errors in the systems and takes necessary actions in accordance with specific rules and protocols defined by the system. The error management module 218 tracks errors that occur during the communications between the SMS 202 and the scheduling system 206, planning system 204, user interface 208, and the subscriber network 210. The error management module 218 also tracks errors that occur within the modules of the SMS 202.

User Interface Module

The user interface module has a plurality of modules that are operative to deploy the front end user interface 208. The modules include the security module 226, the administration module 228, the user module 230, and the view configuration manager 232. The user interface module 224 handles the front end application that is presented to users via the user interface 208. This front end application may be a kiosk based user interface, web browser based user interface, or other user interface defined by the user interface control module.

The security module 226 handles all facets of user and transaction security including setup of roles, assignment of roles, data access, and authentication. The security features in the SMS 202 are designed to meet the requirements of a wide base of users. The security module allows for users to be authenticated using an application login and password. The may also be done by an LDAP server or active directory server. The security module 226 is used to assign roles to users. Based on the roles, users are can be restricted to certain access to specific views and data. The security module can audit and record all actions performed by users, which can be recorded in audit logs. The security module 226 handles encryption of sensitive user data. Data transmitted to browser based user interfaces can be secured with 128-bit SSL encryption.

The view configuration manager 232 is used to define screen layouts that will present the virtual schedule in the SMS 202 to end users via the user interface 208. The view configuration manager 232 also handles the logic and navigation of the user through the different views, screens, and menus that are available through the user interface.

The view configuration manager 232 also handles the application of specific modules or view packs that are loaded into the user interface module. Preferably the view packs or modules are configured to meet the specific needs of the customer. The view configuration manager 232 can make the modules available instantaneously through the user interface. For example in this embodiment there is an administration module 228 and a user module 230. The administration module 228 is configured to provide a web-based console for administration of SMS 202 including user management, view management, and log management. The administration module 230 allows for composite views that are configurable allowing for filtering, sorting, and searching within the schedule. The administration module 228 allows administrators to log in and approve updates that have been queued in the scheduling system 206 and/or one or more of the planning systems 204. The user module 230 is configured to provide a kiosk-based interface for providing status updates to work orders by workers during the scheduled outage period.

Notification Module

The notification module 222 handles facets of notifications to users for events that occur in the SMS 202. The notification module 222 manages the subscriber networks 210 and handles the publishing of information to the subscribers within each of the subscriber networks 210. The notification module determines which subscriber networks based on the established subscriber networks 210 and the association of the subscribers with specific work activities that are being updated by the user interface 208, the scheduling system 206, and the planning systems 204. Preferably, the subscribers receive updates via automated electronic communications, such as pager alerts, emails, text methods, or other forms of electronic communication. Each subscriber network 210 and subscriber may have settings and preferences that determine how notifications are published to the subscriber. The notification module 222 may also determine the frequency and timing that the notifications are published to subscribers. The notification module 222 handles all of the user preferences and the methods of communicating with the subscribers and services that they want the notifications to be received. Preferably, the notification module 222 can be used to update which subscriber networks 210 and individual subscribers are associated with specific work orders throughout the maintenance period. The notification module 222 can also be used to update the subscriber network 210 settings and preferences.

Methods of Managing Scheduled Maintenance of an Asset

Figure 4:
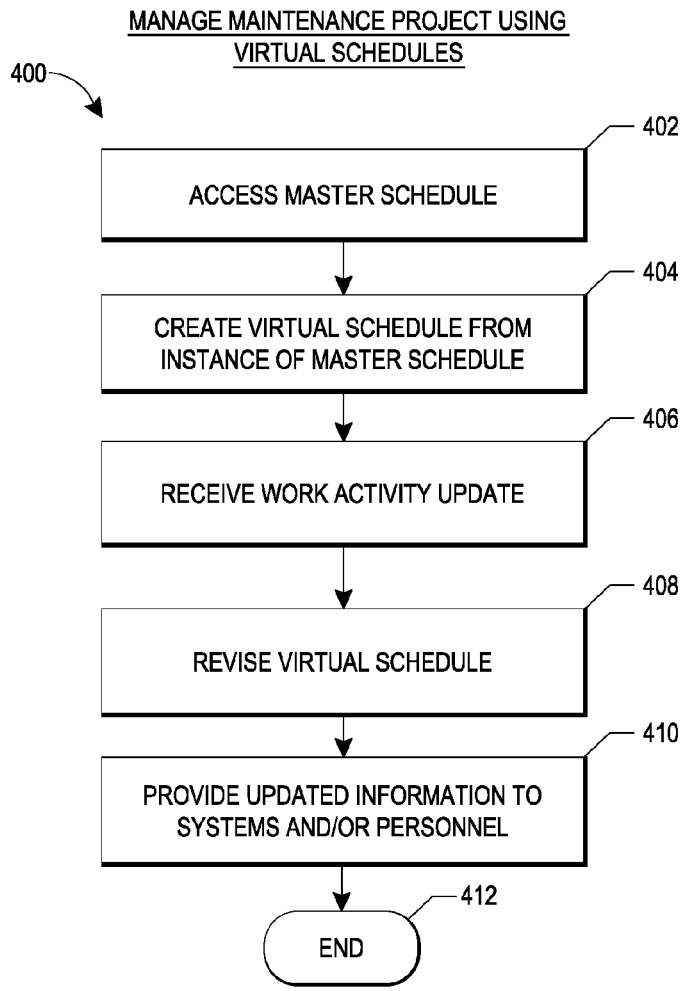
FIG. 4 is a flow diagram of an illustrative method implemented by a schedule management system to manage a maintenance project using federated schedules.
Figure 5:
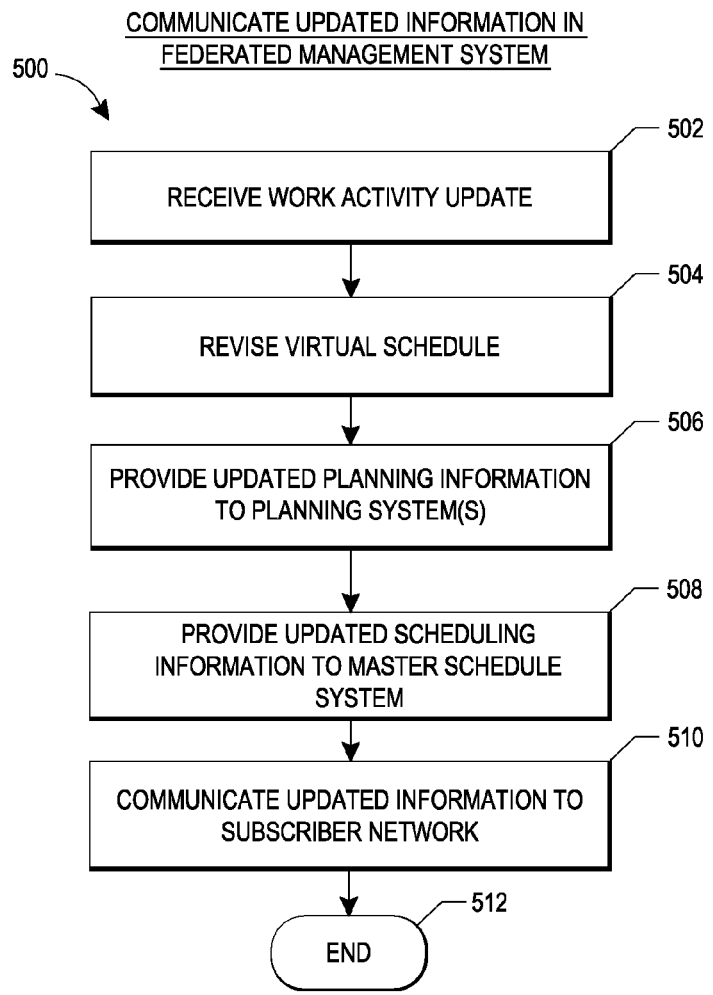
FIG. 5 is a flow diagram of an illustrative method implemented by a schedule management system to communicate updated information in federated management system.
Figure 6:
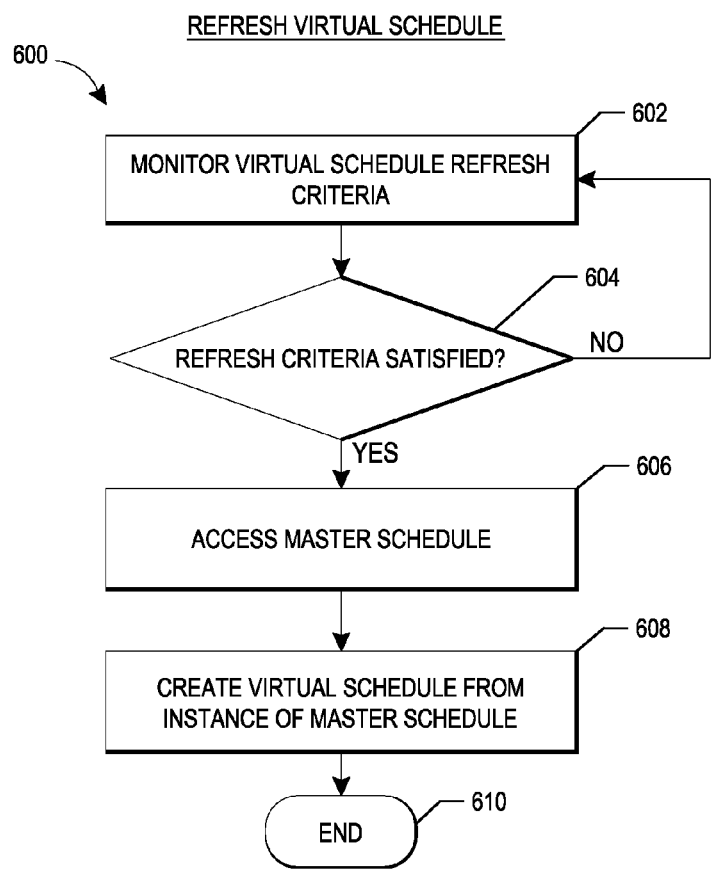
FIG. 6 is a flow diagram of an illustrative method implemented by a schedule management system to refresh virtual schedule.

FIGS. 4-6 illustrate example methods of managing maintenance projects during a scheduled maintenance period using a maintenance system 100, 200 including a schedule management system 202, such as those shown in FIGS. 1-3. The methods can be implemented by one or more modules associated with the schedule management system 202 or other components of the system 100, 200.

FIG. 4 illustrates a method 400, according to some embodiments, of managing a maintenance project of an asset using virtual schedules. The master schedule can be maintained by a scheduling system and can include information about maintenance activities, structured work activities to be performed during a scheduled maintenance period, and other work activities to be performed at the asset location, including, for example, work activities that are not related to maintenance or inspection. The master schedule can receive information from one or more planning systems associated with the asset, including, for example, equipment control systems, resource calendars or schedules, and so forth.

At 402, a copy of the master schedule or at least a portion of the data in the master schedule is retrieved from the scheduling system. In some cases, the master schedule has data that is not applicable to the maintenance project. In certain such cases, at least some of the data associated with the master schedule is not accessed. In some embodiments, all or substantially all master schedule data that relates to work activities that are performed during the maintenance project are accessed from the scheduling system and stored in the schedule management system. In certain embodiments, an instance of the master schedule data or a portion thereof is captured at a point in time before the beginning of the scheduled maintenance period or at a point in time during the scheduled maintenance period.

At 404, a virtual schedule is generated by the schedule management system from an instance of the master schedule. For example, the virtual schedule can incorporate some, substantially all, or all data accessed from the master schedule. In some embodiments, the virtual schedule is maintained separate from the master schedule and can, for example, be maintained on a computer system or group of computer systems apart from the system on which the master schedule is maintained. In certain embodiments, the virtual schedule is maintained on the same system as the master schedule but in separate files. The virtual schedule can be an instance or snapshot of the master schedule or a portion of the master schedule at a point in time. Personnel involved with the maintenance project are permitted to make live updates to the virtual schedule without risk of compromising the schedule in the master schedule. For example, updates to the virtual schedule can be made without administrator and/or other manual approval.

At 406, a work activity update is performed. The work activity update can include updated information regarding work activity completion and/or other aspects of the work activity status. In some embodiments, a worker assigned to work on the work activity uses a kiosk, mobile device, or other suitable user interface to enter data into an electronic system. The data can be communicated over a data communications network to a computing system where the schedule management system and virtual schedule resides. In certain embodiments, defined rules are used to check for errors in the work activity update before updated information is accepted for entry into the virtual schedule. The defined rules can be automatically applied to incoming work activity updates and, in some embodiments, are applied while creating little or no delay in the flow of updated information to the system where the virtual schedule is maintained. In some embodiments, a work activity update is initiated or entered by scanning a printed bar code, touching a user interface element on a kiosk touchscreen, typing information into a keyboard, speaking into a microphone, entering data into a mobile device, entering data in another suitable manner, or entering data using a combination of techniques. In certain embodiments, a worker provides user authentication before he or she is permitted to enter work activity update information.

At 408, the virtual schedule is revised. Updated information in the work activity update received at 406 can be used to change values in the virtual schedule, replace data structures or objects in the virtual schedule, or otherwise trigger revisions to data stored in the virtual schedule. In some embodiments, the revisions to the virtual schedule occur substantially in real-time. For example, there may be only a an imperceptible delay between the time when a worker enters the work activity update and the time when the virtual schedule is revised to include information from the work activity update. Thus, the virtual schedule can present a substantially live, or near real-time view of status for maintenance work activities, predecessor dependencies, and successor tasks.

At 410, updated information is provided to other systems and/or personnel associated with the maintenance project. For example, updated scheduling information can be sent to a scheduling system so that it can be incorporated into the master schedule. Updated planning information can be sent to one or more planning systems. Information sent to other systems may be placed in a queue for approval by one or more administrators or other management personnel. Thus, the master schedule and/or planning systems may not contain a live or real-time view of updated information from recent work activity updates.

Updated information can also be communicated to personnel in a subscriber network. A subscriber network can be applicable to an individual work activity or to a group of work activities to be performed during the maintenance project. In some embodiments, the subscriber network includes personnel that are working on or otherwise attached to a work activity, a predecessor dependency of the work activity, and/or a successor work activity. The subscriber network can also include one or more administrators or other management personnel. Updated information can be communicated via a subscriber network whenever a work activity update is received, when a work activity update meets defined criteria, or in other appropriate circumstances.

At 412, the illustrated portion of the maintenance project management method 400 ends. One or more of the steps of the method 400 shown in FIG. 4 can be repeated until the maintenance project is completed or otherwise terminated. For example, the processes at 406, 408 and 410 can be repeated as additional work activity updates are received from workers. As another example, the processes at 402 and 404 can be repeated when the virtual schedule is refreshed with a new instance of the master schedule.

FIG. 5 shows a method 500 of communicating updated information to personnel as updates to the virtual schedule are made. Communications between system and personnel can generally occur via one or more electronic data communications methods including email, mobile phone text messaging, pager message, and so forth. In some embodiments, communications occur substantially in real-time as progress reports are received from workers performing work activities, even though updated information is not necessarily entered into the master schedule and/or one or more planning systems in real time.

At 502, a work activity update is received from one or more personnel attached to a task. The work activity update can be received by any of the techniques described herein or any other suitable technique.

At 504, the virtual schedule is revised. Revisions to the virtual schedule can occur substantially in real-time and can be performed according to any of the techniques disclosed herein or any other suitable technique.

At 506, updated planning information is provided to one or more planning systems. In some embodiments, it is determined whether the updated information contained in the work activity update includes any updated planning information. When there is updated planning information, that information is transmitted to one or more planning systems. When there is no updated planning information, there may be no information transmitted to a planning system at the time that the work activity update is received. While updated planning information will be reflected in the schedule management system in substantially real-time or with only a small delay after the work activity update is received, the updated information may not be reflected in the planning systems immediately. For example, updated planning information may require manual review before the information is transmitted to the planning systems. In certain embodiments, updated planning information is automatically updated by the schedule management system into planning systems after such information is provided to the virtual schedule.

At 508, updated scheduling information is provided to a scheduling system. In some embodiments, it is determined whether the updated information contained in the work activity update includes any updated scheduling information. When there is updated scheduling information, that information is transmitted to the scheduling system. When there is no updated scheduling information, there may be no information transmitted to a scheduling system at the time that the work activity update is received. While updated scheduling information may be transmitted to a scheduling system in substantially real-time or with only a small delay after the work activity update is received, the updated information may not be reflected in the scheduling system immediately. For example, updated scheduling information may require manual review before the information is transmitted to the scheduling system. In certain embodiments, updated scheduling information is automatically transmitted to a scheduling system after a work activity is updated in the virtual schedule.

At 510, updated information from the work activity update is communicated to personnel in a subscriber network. A subscriber network can be applicable to an individual work activity or to a group of work activities to be performed during the maintenance project. In some embodiments, the subscriber network includes personnel that are working on or otherwise attached to a work activity, a predecessor dependency of the work activity, and/or a successor work activity. The subscriber network can also include one or more administrators or other management personnel. Updated information can be communicated via a subscriber network whenever a work activity update is received, when a work activity update meets defined criteria, or in other appropriate circumstances.

At 512, the illustrated portion of the method 500 ends. One or more of the steps of the method 500 shown in FIG. 5 can be repeated until the maintenance project is completed or otherwise terminated. For example, the method 500 can be repeated as additional work activity updates are received from workers.

In FIG. 6, a method 600 of refreshing a virtual schedule is shown. From time to time, additional work activities may be added to the planning and scheduling systems and/or certain fields of existing work activities may be modified in these systems. The schedule management system will occasionally refresh the virtual schedule to reflect any changes to or additions of work activities in the planning and scheduling systems.

At 602, criteria for determining whether to refresh the virtual schedule can be monitored. For example, a timer can be set to refresh the virtual schedule at regular intervals, or a user interface element can be polled to determine whether a user has requested that the virtual schedule be refreshed. In certain embodiments, the virtual schedule is refreshed if it is determined that the virtual schedule includes erroneous or otherwise unwanted information. In some embodiments, no monitoring or only passive monitoring is performed. For example, a user instruction can trigger a refresh to the virtual schedule without any monitoring. In certain embodiments, an active and/or automatic monitoring module detects when a schedule refresh may be beneficial and automatically initiates a refresh or indicates to a user that a refresh may be beneficial.

At 604, it is determined whether the refresh criteria are satisfied. If the refresh criteria are not satisfied, the method returns to 602. If the refresh criteria are satisfied, or if a refresh request is received, the method proceeds to 606.

At 606, a copy of the master schedule or at least a portion of the data in the master schedule is retrieved from the scheduling system. In some cases, the master schedule has data that is not applicable to the maintenance project. In certain such cases, at least some of the data associated with the master schedule is not accessed. In some embodiments, all or substantially all master schedule data that relates to work activities that are performed during the maintenance project are accessed from the scheduling system and stored in the schedule management system. The data retrieved from the master schedule reflect the data in the master schedule at a point in time when or shortly after the virtual schedule refresh is requested.

At 608, a new virtual schedule is created, or the existing virtual schedule is revised, to reflect the data retrieved from the master schedule. For example, the virtual schedule can incorporate some, substantially all, or all data accessed from the master schedule. In some embodiments the virtual schedule is maintained separate from the master schedule generally on a computer system apart from the system on which the master schedule is maintained. In certain embodiments, the virtual schedule is maintained on the same system as the master schedule but in separate files. The virtual schedule is an instance or snapshot of the master schedule or a portion of the master schedule at a point in time. Personnel involved with the maintenance project are permitted to make live updates to the virtual schedule.

At 610, the illustrated portion of the method 600 ends. One or more of the steps of the method 600 shown in FIG. 6 can be repeated from time to time until the maintenance project is completed or otherwise terminated. For example, the method 600 can be repeated as virtual schedule refreshes are desired.

Example Architecture for Scheduled Maintenance Management Systems and Methods

The following describes examples of certain systems and methods disclosed herein as applied to a maintenance project carried out during an STO at a large-scale plant. The following examples are intended to be illustrative and are not intended to be limiting.

In the following examples, schedule management system includes a web-based interface and physical kiosks to make the viewing and capturing of status information simple and efficient. Software from SAP AG of Walldorf, Germany is used for planning of work and Primavera P6, an enterprise project portfolio management tool from Oracle Corporation of Redwood City, Calif., USA, is used for scheduling. Once the work is planned and released within SAP, it is ready for scheduling in Primavera. An interface will extract the work orders and operations and transfer them to Primavera. In addition to transferring Work Orders to Primavera, the interface will transfer Work Authorization Requests (WARS) from eSOMS to Primavera. Lastly, the interface will update SAP and eSOMS with the scheduled dates and durations from Primavera.

Figure 7:
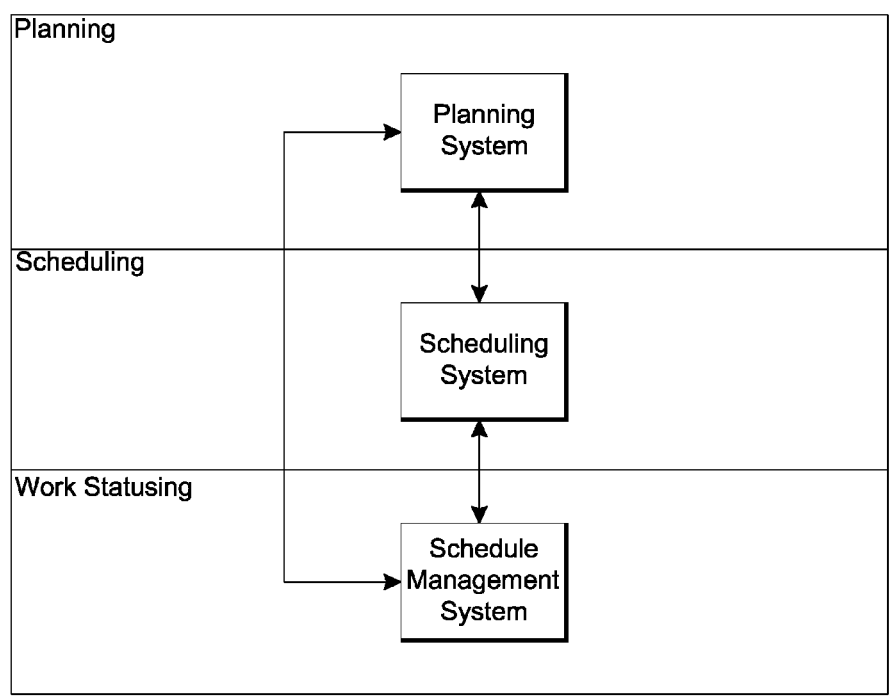
FIG. 7 is a flow diagram of a planning and scheduling process for a maintenance management period.

The work execution of scheduled activities involves the Maintenance groups. To provide easy access to the daily scheduled activities to these groups, the SMS application is used. The activities are brought into the SMS from the scheduling system. FIG. 7 illustrates a high-level diagram of the planning and scheduling process.

Figure 8:
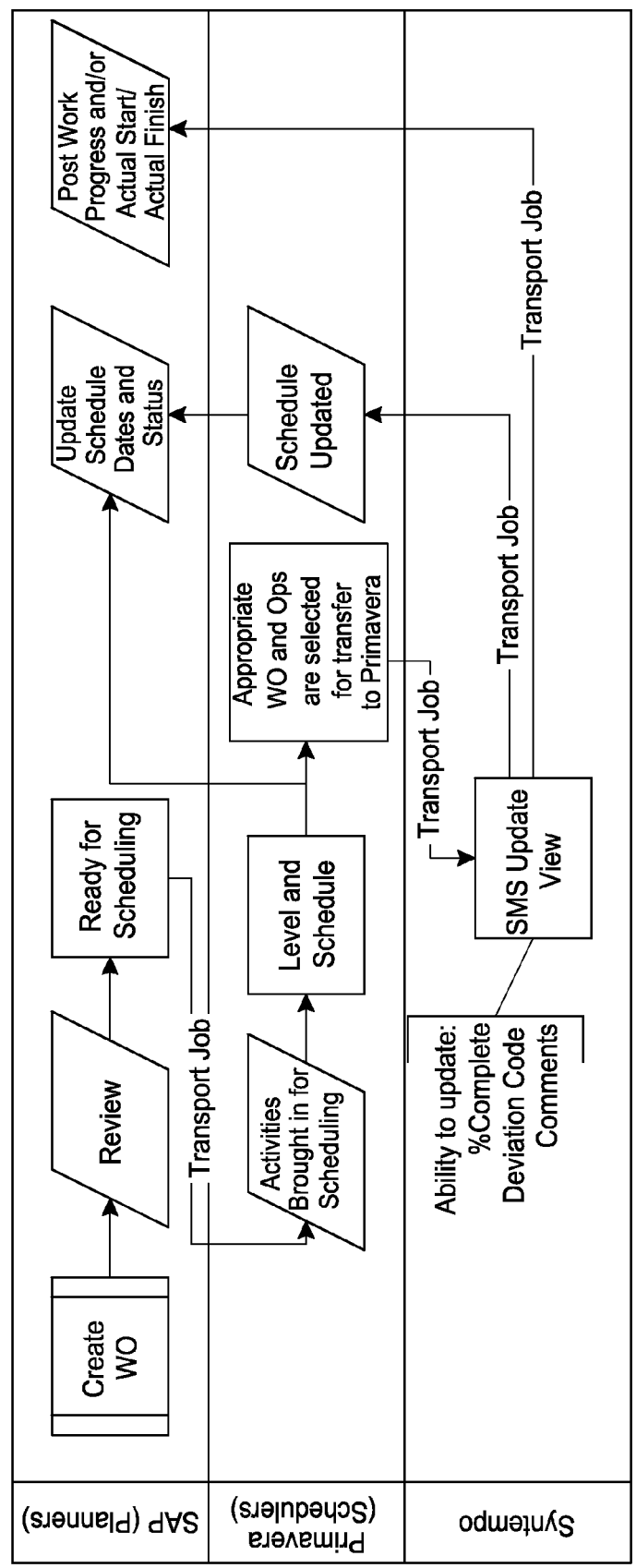
FIG. 8 is a flow diagram of a planning and scheduling process for a maintenance management period.

The work execution of scheduled activities involves the Maintenance groups. To provide easy access to the daily scheduled activities to these groups, an SMS is used. The activities are brought into the SMS from a scheduling system. FIG. 8 is a high-level diagram of the planning and scheduling process.

An example SMS can be used for work execution and the overall solution will be a combination of an SMS views and transport jobs. The following three (3) SMS views are configured: (1) Craft Work Status on Kiosk; (2) Schedule Update; and (3) Scheduler Approval.

The following three (3) transport interface jobs will be configured: (1) S1—Scheduling System to SMS Load; (2) S2—SMS to Scheduling System Update; and (3) S3'SMS to Planning System Confirmations.

The SMS uses activity objects and activity transaction objects. An "Activity Object" represents a single Primavera Activity and is used for display and data-entry purposes. An "Activity Transaction Object" represents a change transaction where the SMS user changed or updated a single Activity. A single Activity object can have many related Activity Transaction objects. The Activity Transaction serves as the mechanism to send updates back to Primavera and SAP, as well as an audit log to show all the changes made to a given Activity.

The Activity object "dirty flag" is a flag that indicates whether an Activity has been changed in some way since the last time the Activity was refreshed from Primavera via Transport Job 51. The following table defines how the "dirty flag" is changed:

Table A:

TABLE A

| Activity Event | Set Dirty Flag | Clear Dirty Flag | Comment |
|---|---|---|---|
| Start Activity | X | | From Kiosk or web |
| Cancel Start | | X | From Kiosk or web |
| Status Activity | X | | From Kiosk or web |
| Complete Activity | X | | From Kiosk or web |
| Transport Job S1 Refresh for Activity without any pending outbound Activity Transactions | | X | |
| Transport Job S1 Refresh for Activity with one or more pending outbound Activity Transactions | | | Dirty flag is not altered in this case |

A SMS allows the setup of a security model to limit menus by role and data visibility based on user attributes. FIG. 9 illustrates an embodiment of an SMS User Profile screen.

In the user maintenance screen, an administrator will be able to assign one or more roles to an SMS User, including: (1) Administrator (access to administration menu items); (2) Kiosk (access to Kiosk for Work Status input); (3) Maintenance (access to Schedule Update); and (4) Scheduler (access to Schedule Update and Approvals).

In some embodiments the Kiosk user role enforcement does not need to be active. There is no requirement that a kiosk user must be associated with an existing SMS user account. And the only requirement for kiosk users is that they must be in possession of any proximity ID card.

Authentication of users on the Kiosk may be via an employee badge. The user may not need to have been setup as a Kiosk user in advance. Authentication of users on the web portal can be via a username and password.

The ability to update Activities within each view is defined by "attributes" assigned in the User Maintenance. The Shop attribute is used for limiting records update in the Kiosk Status Update and the Schedule Update views. The users will be assigned to one or more one or more Shops via the Shop attribute.

Primavera Activity Code "Work Center" determines the Shop for a given Activity. The Activity Code Value normally looks like "XYZ-ABC" where the first two characters of "XYZ" represent the shop and "ABC" represents the crew. The SMS may assign a value of all Shops, enables the user to have an automatic association with all Shops, even as the list of shops changes.

The SMS Views provide users with an interface to perform their work execution tasks. In the Kiosk section the terms "Operation" and "Activity" represent an SMS Activity object. While these terms could be used interchangeably, the term "Operation" is used within the context of the Kiosks sections, and the term "Activity" is used everywhere else.

The Craft Work Status Kiosk business process is used by the Crafts to status the Operations as work is started, progressed and completed. This view is only available through the Kiosk.

There are four business processes that are available via the kiosk: (1) Start Operation, (2) Cancel a started Operation, (3) Progress Operation, and (4) Complete Operation. An operation cannot be cancelled if (a) Start Operation Transaction was sent to SAP or (b) subsequent Progress Operation Transaction was sent to SAP.

SMS Activity Transactions representing the completion of an Activity/Operation must ultimately be approved by the appropriate personnel, whereas other SMS Activity Transactions do not require approval in order to be sent to SAP via Transport Job S3.

The crafts person can login to the Kiosk using a badge card. After the individual has logged in the user can scan or enter the appropriate Operation ID. If the Operation is found, then the user can status the Operation.

Figure 10:
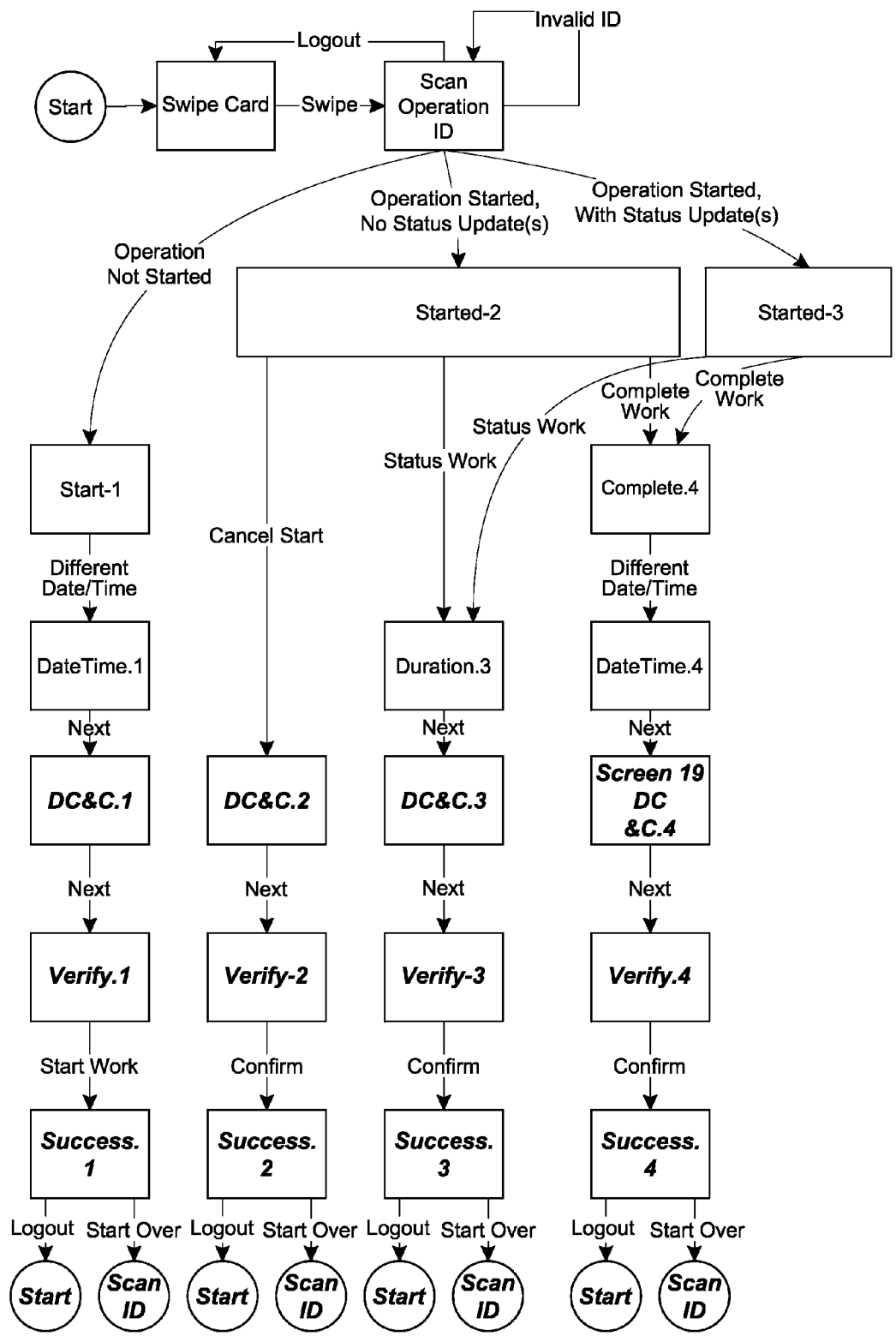
FIG. 10 is a flow diagram of the expected screen flow for a kiosk that would be used by a worker during a scheduled maintenance period.

FIG. 10 illustrates an embodiment of an expected screen flow for a kiosk user.

If an Operation has not yet been started then the kiosk user is presented with the ability to start the Operation. This process requires the user to provide the start date/time along with an optional schedule deviation code and comments. Starting an Operation sets the "dirty" flag for that Operation. Preferably, the start date/time is defaulted to the current system date/time.

The starting of an Operation via the kiosk results in the creation of an Activity Transaction that will be sent to SAP and Primavera to indicate that the Activity has been started. This Activity Transaction does not require any SAP approval in order to be sent to SAP; however, it does require Scheduler approval in order to be sent to Primavera.

If an Operation has been started then the kiosk user is presented with the ability to cancel the Operation. This is true as long as the Operation's start transaction has not been sent to SAP and no subsequent status transactions have been created. Cancelling an Activity clears the "dirty" flag for the processed Operation. If the user is able to cancel an Operation then the SMS must ensure that the original Start Activity transaction is not sent to Primavera or SAP.

If an Operation has been started then the kiosk user is presented with the ability to status the Operation. This process basically requires the user to provide the remaining duration along with optional schedule deviation code and comments. This process sets the "dirty" flag for the processed Activity. Preferably the remaining duration is defaulted to the current remaining duration for the Operation.

If an Operation has been started then the kiosk user is presented with the ability to complete the Operation. This process requires the user to provide the finish date/time along with any optional schedule deviation code and comments. This process sets the "dirty" flag for the processed Operation. Preferably the finish date/time is defaulted to the current system date/time.

The Schedule Update View is used to review and update the work status for activities. The user can sort the information in the view by clicking on any one of the column headers. The Status column icons represent the current state of an Activity and can have a status of (1) Completed, (2) Started, and (3) Not Started. The "Pred Status" column icons represent the current state of the Activity's predecessor(s) and can have a status of (1) Complete, (2) Incomplete, and (3) Not Started. The "Actions" column icons represent the available actions that the user can take, which include (1) Status Activity and (2) Start Activity.

All Activities that match the SMS User's Shop attribute assignments are available for display. This view will not display Activities that have been completed and have no pending outbound Transactions. Preferably the user has the ability to assign all shops to an SMS user which means that all records will be visible.

The Schedule Update View supports the ability to use complex filters based on all the available SMS fields. The ability to support complex filters provides the required infrastructure in order to display specialized sub-sets of Activities such as: (1) Activities that were supposed to be started but were not, (2) Activities that were supposed to be finished but were not, and (3) Activities that were supposed to be statused but were not. In order to create, or delete, a public filter the SMS User must be assigned the Administration Role.

This view supports two modes of data entry: (1) Direct data entry and (2) Indirect data entry. The direct data entry mode allows users to update an Activity directly from the data grid that makes up this view. This view will only allow direct data updates of specific fields. The APPR checkbox may be updated, which indicates that the Activity has been reviewed by the appropriate personnel. This does not set the dirty flag. The SAP checkbox may be updated, which indicates that the Activity has been fully completed by the appropriate personnel. This must not set the dirty flag.

The "APPR" flag should not be confused with the approval flag in the Scheduler Approval view. The "APPR" flag in the Schedule Update view is intended as a communication mechanism with the Scheduler to let them know that this Activity has been reviewed. For direct data entry fields the system will save any changes automatically as the user navigates from the updated field.

The indirect data entry mode allows users to update an Activity indirectly from the data grid by first clicking an icon in the "Actions" column. This view will allow indirect data updates for the following actions: (1) Start Activity, (2) Cancel Activity Start (Uses action icon in Transaction section), (3) Status Activity, and (4) Complete Activity.

If an Activity has not yet been started then the user is presented with the ability to start the Activity. This process basically requires the user to provide the start date/time along with an optional schedule deviation code and/or comments. Starting an Activity sets the "dirty" flag for that Activity. Preferably the start date/time is defaulted to the current system date/time. The starting of an Activity results in the creation of an Activity Transaction that is sent to SAP and Primavera to indicate that the Activity has been started. This Activity Transaction does not require SAP approval in order to be sent to SAP; however, it does require Scheduler approval in order to be sent to Primavera.

If an Activity has been started then the user is presented with the ability to cancel the Activity. The user may cancel the Activity as long as the Activity's start transaction has not been processed and no subsequent status transactions have been created. Cancelling an Activity Start clears the "dirty" flag for the processed Activity. If the user cancels an Activity then the SMS does not send the original Start Activity transaction to Primavera or SAP.

If an Activity has been started then the user is presented with the ability to status the Activity. This process requires the user to provide the remaining duration along with an optional schedule deviation code and comments. This process sets the "dirty" flag for the processed Activity. Preferably, the remaining duration is defaulted to the current remaining duration for the Activity.

If an Activity has been started then the user is presented with the ability to complete the Activity. This process requires the user to provide the finish date/time along with optional schedule deviation code and comments. This process sets the "dirty" flag for the processed Activity. Preferably the finish date/time is defaulted to the current system date/time.

The Schedule Update View may allow the user to send alert messages to an SMS User's pager number as defined in the SMS User definition. The pager message may be sent as an email message. Preferably the message component includes the following items: (1) Activity ID, (2) Activity Description, and (3) Status (Activity Started, Activity Statused, Activity Completed).

The Schedule Update View may be enhanced to support the ability to display different row highlighting based on current float. The date/time math above may be based on a 24-hour calendar which means that we do not have to consider assigned Primavera calendars.

Activity rows can be highlighted as follows:
Table B:

TABLE B

| Condition | Row Highlighting |
|---|---|
| CF > 6.0 hours | No highlighting required |
| 0 < CF <= 6.0 hours | Yellow highlighting |
| CF <= 0 hours | Red highlighting |

Figure 11:
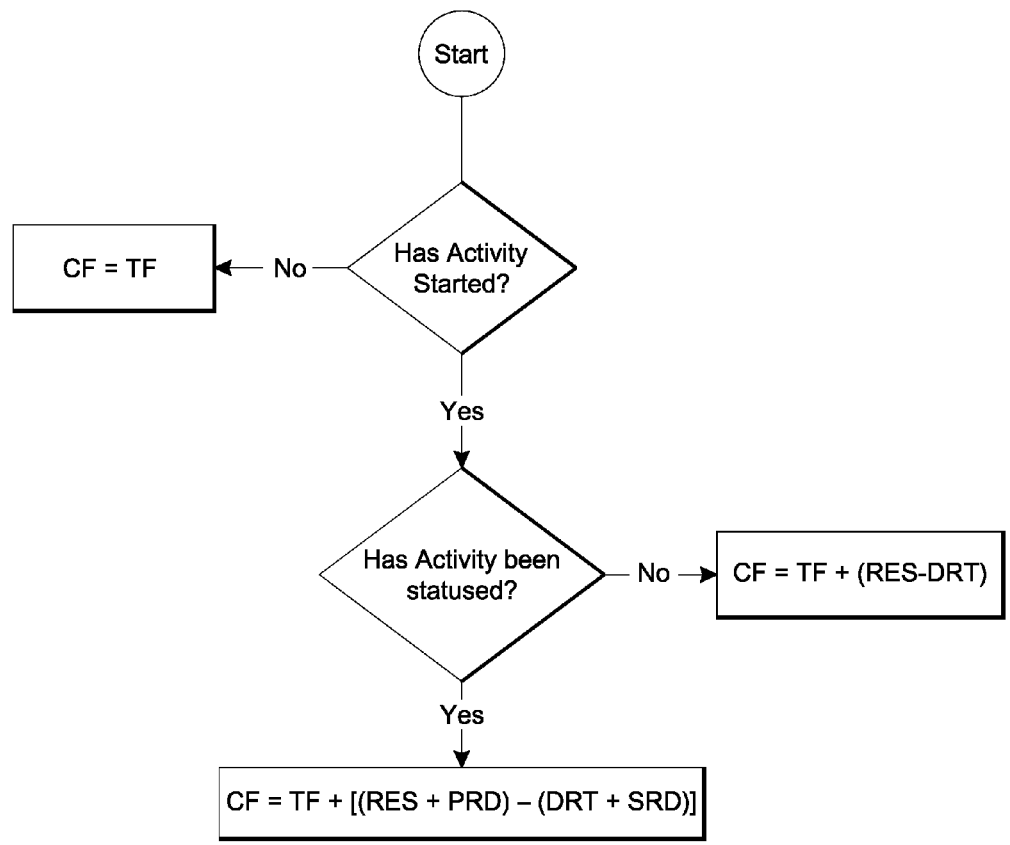
FIG. 11 is a flow diagram of the determination of float based calculations performed by a schedule management system during a scheduled maintenance period.

FIG. 11 illustrates a flow diagram showing the determination of the float based calculations. The calculations are based on the following variables:
CF=Current Float
TF=Total Float from Primavera
RES=Remaining Early Start from Primavera
DRT=Data Refresh Time (This is the SMS Actual Start time or the most recent SMS Status Time)
PRD=Remaining Duration from Primavera. This value is populated during the S1 refresh and is not directly changed by any SMS transactions.
SRD=SMS Remaining Duration (Latest Remaining Duration value entered via SMS)

The Scheduler Approval View is used to accept/reject pending Activity Transactions for updates back to Primavera. The accepted entries will be updated to Primavera by Maxavera transport job S2. The user will be able to sort the information in the view by clicking on any one of the column headers. The rejected records will not be processed and there is no requirement for workflow or notification to inform personnel.

The user can sort the information in the view by clicking on any one of the column headers. The "Pred Status" column icons represent the current state of the Activity's predecessor(s) and can have a status of (1) Complete, (2) Incomplete, and (3) Not Started.

Only transactions with a pending status update will be shown for approval. An "Approve All" checkbox is available which will place a check mark in the Scheduler Approval fields.

The Scheduler Approval View supports the ability to use complex filters based on all the available SMS fields. In order to create, or delete, a public filter the SMS User must be assigned the Administration Role.

The view will allow update to the Scheduler Approval field. The user will have to click the "Approve" or "Reject" buttons in order to approve or reject the relevant Activity Transactions. Please be aware that the "APPR" flag should not be confused with the Scheduler Approval checkbox. The "APPR" flag is intended as a communication mechanism with the Scheduler to let them know that this Activity has been reviewed.

Figure 12:
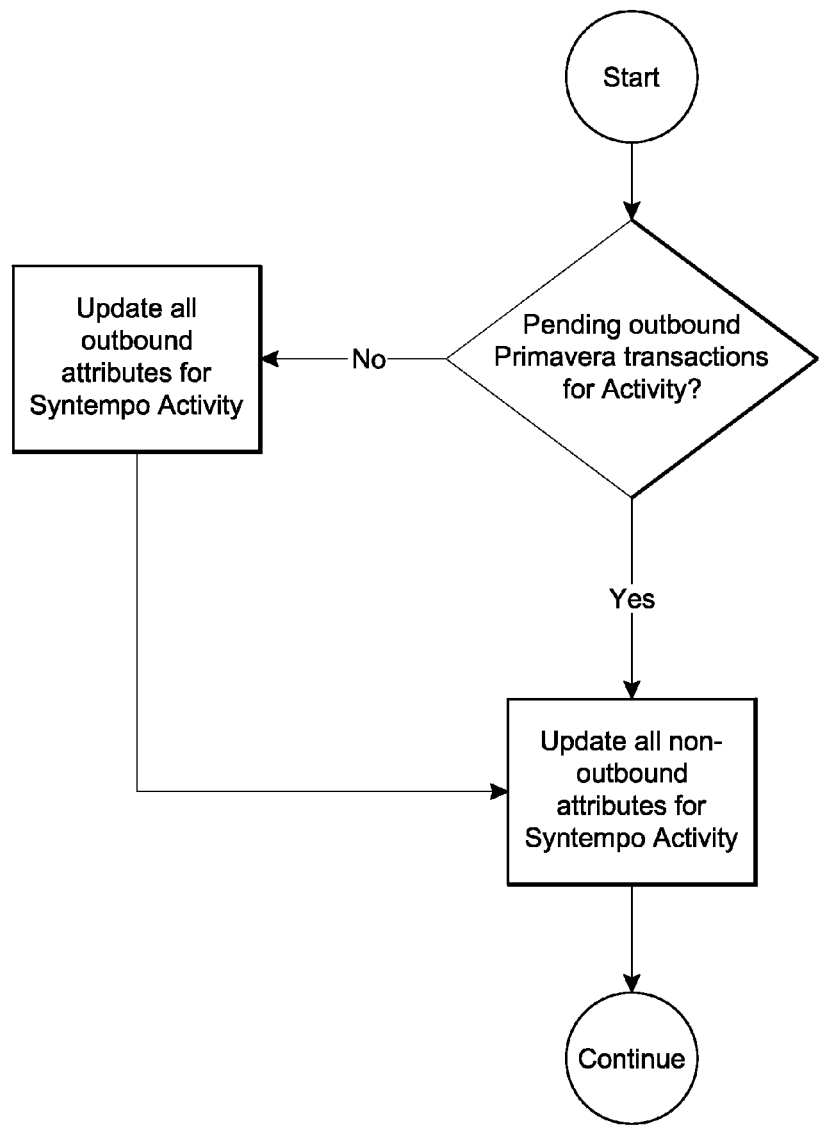
FIG. 12 is a flow diagram that illustrates the process for making a determination whether or not to overwrite the relevant activity fields.

The purpose of Transport Job S1—Primavera to SMS Refresh is to load Primavera activities into the SMS. This job will find matching activities and their associated resources and relationships and transfer them to the SMS. This job also maintains the list of available Schedule Deviation Codes in the SMS. This Transport Job deletes all SMS Activities that correspond to Primavera Activities that are no longer present in the Primavera Project. If the SMS has any unprocessed Primavera-bound transactions, Transport Job S1 makes a determination whether or not to overwrite the relevant SMS Activity fields. FIG. 12 is a flow diagram that illustrates the process for making a determination whether or not to overwrite the relevant SMS activity fields. Transport Job S1 does not consider processing Activities with the following Activity Types: (1) Start Milestone, (2) Finish Milestone, and (3) Level of Effort.

Transport Job S1 normally clears the "dirty flag" for all Activities that it updates in the SMS. However, it will not clear the "dirty flag" if the SMS Activity has any pending outbound Activity Transactions. Transport Job S1 clears the "APPR" field on the SMS Activity object whenever it is executed. Transport Job S1 does not clear the "SAP" field on the SMS Activity object whenever it is executed.

Transport Job S2, SMS to Primavera Update, updates existing Primavera activities with scheduler approved status updates from the SMS. The job will only select records in the SMS that are approved and have not been transferred to Primavera. Records that are approved in the SMS will be processed to Primavera.

The selected records will be processed to Primavera. Once the record is processed to Primavera, the ACTIVITY_TX table will be updated to set the p6_update_ind and the sp6_update_date columns.

If a project is locked in Primavera, the related SMS transaction record(s) will be skipped and processed on the next attempt. If there is any other error, the "p6_update_ind" will be set to 'E' for Error. If the activity update is processed successfully, the "p6_update_ind" will be set to 'S' for Success. When there is an error, the "process_msg" column will be appended with a Date and message.

Based on the value of the "Special Rounding" option the Actual Start and Finish times might be mapped back to Primavera without any minutes. If this option is selected then this means that the SMS will round-up and round-down the hour based on the value of the minutes. If the minutes are greater than or equal to 31 minutes then round up to the next hour; if the minutes are less than 31 minutes then round down.

This Transport Job posts confirmations in SAP based on status updates in the SMS. Once the confirmation is posted to SAP, the record will be marked processed in the SMS so that it does not get processed again. Activity Transactions that were not created via the "Complete Work" process do not have to be approved in order to be considered for integration to SAP. However, Activity Transaction that were created via the "Complete Work" process have to be approved by authorized personnel by clicking the "SAP" checkbox in the Schedule Update View.

Once the record is processed to SAP, the ACTIVITY_TX table will be updated to set the sap_update_ind and the sap_update_date columns. If a record is locked in SAP, the sap_update_ind will be set to 'L' for Locked so it can be re-processed next time. If there is some other error, the sap_update_ind will be set to 'E' for Error. If the confirmation is posted successfully, the sap_status_ind will be set to 'S' for Success. When there is an error, the process_msg column will be appended with a date and message.

This Transport Job considers Activities where "SAP_OP" is set to "Y". An SAP function module is used by this Transport Job in order to post confirmations.

In general, the word "module," as used herein, is used in its broad and ordinary sense and refers, for example, to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays, application-specific circuits, or hardware processors. The modules described herein are preferably implemented as software modules, but may be represented in hardware or firmware. Generally, the modules described herein refer to logical modules that may be combined with other modules or divided into sub-modules despite their physical organization or storage.

The various illustrative logical blocks, modules, data structures, algorithms, equations, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices—for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware or firmware, in a software module executed by a hardware processor, or in a combination of the two. For example, each of the processes described above may also be embodied in, and fully automated by, software modules executed by one or more machines such as computers or computer processors. A module may reside in a non-transitory computer-readable storage medium such as RAM memory, flash memory, ROM memory, EPROM memory, EEPROM memory, registers, a hard disk, a removable disk, a CD-ROM, a DVD, memory capable of storing firmware, or any other form of computer-readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC. Hardware components may communicate with other components via wired or wireless communication networks such as, e.g., the Internet, a wide area network, a local area network, or some other type of network.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

What is claimed is:

1. A system for electronically managing a structured maintenance project for a large-scale asset during a scheduled maintenance period, the system comprising:

a schedule management system configured to facilitate communications among workers and managers during the scheduled maintenance period and expedite completion of the structured maintenance project, wherein the schedule management system comprises instructions stored on one or more memory devices, and wherein the instructions, when executed by one or more hardware processors, cause the schedule management system to:

access planning information from at least one planning system;

access a master schedule from a scheduling system that is configured to aggregate planning information from the at least one planning system, wherein the master schedule is created by the scheduling system using data comprising the planning information and contains scheduling information for structured tasks, wherein the structured tasks have one or more predecessor dependencies, one or more successor tasks, or a combination of predecessor dependencies and successor tasks;

create a secondary schedule from an instance of the master schedule before the scheduled maintenance period begins or during the scheduled maintenance period;

during the scheduled maintenance period, receive a task update for a task in the secondary schedule, wherein the task update provides updated information comprising at least one of updated planning information or updated scheduling information for the task;

revise the secondary schedule to include at least a portion of the updated information when the task update is received;

provide updated planning information to the planning system when the task update includes updated planning information;

provide updated scheduling information to the scheduling system when the task update includes updated scheduling information;

associate the task with a subscriber network comprising personnel attached to one or more predecessor dependencies or successor tasks of the task, wherein the subscriber network is configured to electronically transmit at least a portion of the updated information from the schedule management system to electronic devices used by the personnel; and transmit at least a portion of the updated information via the subscriber network when the task update is received.

2. The system of claim 1, wherein the structured maintenance project is performed during a scheduled outage of the large-scale asset.

3. The system of claim 1, wherein the schedule management system is configured to send planning information to a planning update queue in which updated planning information is approved by an administrator before the updated planning information is permitted to revise the planning system.

4. The system of claim 1, wherein the schedule management system is configured to send updated scheduling information to a schedule update queue.

5. The system of claim 4, wherein an administrator approves updated scheduling information in the schedule update queue before the master calendar is updated to include the updated scheduling information.

6. The system of claim 1, wherein the structured tasks include tasks with finish-to-start dependencies and tasks with start-to-start dependencies.

7. The system of claim 1, wherein the structured tasks include tasks that are performed in series and tasks that are performed in parallel.

8. The system of claim 1, wherein the schedule management system provides an administrator user interface and a worker user interface having fewer permissions to access planning information and scheduling information than the administrator user interface.

9. The system of claim 8, wherein a kiosk positioned near or within a work site of the large-scale asset provides an instance of the worker user interface.

10. The system of claim 9, wherein the kiosk includes an electronic sensor configured to read printed bar codes and QR codes.

11. The system of claim 8, wherein the administrator user interface is accessible to only a restricted subset of personnel attached to the structured maintenance project.

12. The system of claim 1, wherein the schedule management system includes a user interface that requires user authentication before the task update is accepted.

13. The system of claim 1, wherein each of the structured tasks has a scheduled start time, and wherein the schedule management system is configured to electronically notify at least one subscriber network when the scheduled start time has elapsed and the work order has not commenced.

14. The system of claim 1, wherein the task update includes a start time, a completion time, a completion percentage of the task, time remaining for the task, deviation codes, comments, or a combination of the foregoing information.

15. The system of claim 1, wherein the schedule management system is configured to cease operation after the structured maintenance project is completed.

16. The system of claim 1, wherein the large-scale asset is a nuclear power plant, a hydro-electric dam, or an oil refinery.

17. A schedule management system configured to facilitate communications among workers and managers during a scheduled maintenance period and expedite completion of a maintenance project for a large-scale asset, wherein the maintenance project includes structured tasks, the system comprising:
a scheduling system module configured to access a master schedule from a scheduling system, wherein the master schedule includes at least one of planning information or scheduling information for each of the structured tasks, and wherein the structured tasks have one or more predecessor dependencies, one or more successor tasks, or a combination of predecessor dependencies and successor tasks;
a secondary schedule creation module configured to create, before the scheduled maintenance period begins or during the scheduled maintenance period, a secondary schedule that is an instance of the master schedule;
a secondary schedule update module configured to:
receive, during the scheduled maintenance period, a task update for a task in the secondary schedule, wherein the task update provides updated information comprising at least one of updated planning information or updated scheduling information for the task; and
revise the secondary schedule to include at least a portion of the updated information when the task update is received; and
a subscriber network module configured to electronically transmit at least a portion of the updated information from the schedule management system to a subscriber network comprising electronic devices used by personnel attached to one or more predecessor dependencies or successor tasks of the task;
wherein the scheduling system module is configured to provide updated planning information to the planning system when the task update includes updated planning information.

18. The system of claim 17, further comprising a planning system module configured to access planning information from a planning system.

19. The system of claim 18, wherein the planning system module is configured to provide updated planning information to the planning system when the task update includes updated planning information.

20. The system of claim 17, wherein the system is configured to perform a secondary schedule refresh, and wherein an updated version of the master schedule replaces the secondary schedule when the secondary schedule refresh is performed.

21. The system of claim 20, wherein the secondary schedule refresh is performed periodically at regular intervals during the scheduled maintenance period.

22. The system of claim 20, wherein the secondary schedule refresh is performed when the master schedule is updated.

23. The system of claim 20, wherein the secondary schedule refresh is performed at user-controlled times.

24. The system of claim 17, wherein the system is configured to identify task updates that are awaiting approval and to prevent values for tasks associated with the task updates awaiting approval from being overwritten.

25. The system of claim 17, wherein the system is configured to automatically determine whether the task update contains an error according to one or more defined rules.

26. The system of claim 25, wherein the secondary schedule is not revised to include updated information from the task update when it is determined that the task update contains an error.

27. The system of claim 17, wherein the subscriber network module is configured to transmit a text message, an email, a pager notification, or a combination of electronic messages to the subscriber network.

28. A method for managing a maintenance project for a large-scale asset during a scheduled maintenance period, wherein the maintenance project includes structured tasks, the method comprising:
accessing planning information from at least one planning system;

accessing a master schedule from a scheduling system that is configured to aggregate planning information from the at least one planning system, wherein the master schedule is created by the scheduling system using data comprising the planning information and contains scheduling information for structured tasks, wherein the structured tasks have one or more predecessor dependencies, one or more successor tasks, or a combination of predecessor dependencies and successor tasks;

creating a secondary schedule from an instance of the master schedule before the scheduled maintenance period begins or during the scheduled maintenance period;

during the scheduled maintenance period, receiving a task update for a task in the secondary schedule, wherein the task update provides updated information comprising at least one of updated planning information or updated scheduling information for the task;

revising the secondary schedule to include at least a portion of the updated information when the task update is received;

providing updated planning information to the planning system when the task update includes updated planning information;

providing updated scheduling information to the scheduling system when the task update includes updated scheduling information;

associating the task with a subscriber network comprising personnel attached to one or more predecessor dependencies or successor tasks of the task; and electronically transmitting at least a portion of the updated information to electronic devices used by the personnel within the subscriber network after the task update is received.

29. The method of claim 28, further comprising communicating updated information to the subscriber network for an elapsed task, wherein the elapsed task has a timing component that has been exceeded, and wherein the subscriber network is associated with a successor task to the elapsed task.

30. The method of claim 28, further comprising ceasing use of the secondary schedule after the structured maintenance project is completed.

* * * * *

UNITED STATES PATENT AND TRADEMARK OFFICE
CERTIFICATE OF CORRECTION

PATENT NO.       : 8,600,536 B2                                   Page 1 of 1
APPLICATION NO.  : 13/865905
DATED            : December 3, 2013
INVENTOR(S)      : Sundling, Jr. et al.

It is certified that error appears in the above-identified patent and that said Letters Patent is hereby corrected as shown below:

In the Specification

In column 21 at line 14 (approx.), Change "S3' SMS" to --S3 - SMS--.

In column 21 at line 30 (approx.), Change "51." to --S1.--.

Signed and Sealed this
First Day of July, 2014

Michelle K. Lee
*Deputy Director of the United States Patent and Trademark Office*